(12) United States Patent
Yang et al.

(10) Patent No.: US 10,999,511 B2
(45) Date of Patent: May 4, 2021

(54) LIDAR AND CAMERA SYNCHRONIZATION

(71) Applicant: DeepMap Inc., Palo Alto, CA (US)

(72) Inventors: Lin Yang, San Carlos, CA (US); Mark Damon Wheeler, Saratoga, CA (US)

(73) Assignee: DEEPMAP INC., Palo Alto, CA (US)

( * ) Notice: Subject to any disclaimer, the term of this patent is extended or adjusted under 35 U.S.C. 154(b) by 106 days.

(21) Appl. No.: 16/580,969

(22) Filed: Sep. 24, 2019

(65) Prior Publication Data

US 2020/0021728 A1 Jan. 16, 2020

Related U.S. Application Data

(62) Division of application No. 16/163,463, filed on Oct. 17, 2018, now Pat. No. 10,469,753.

(Continued)

(51) Int. Cl.
*H04N 5/232* (2006.01)
*G01S 17/87* (2020.01)
(Continued)

(52) U.S. Cl.
CPC ....... *H04N 5/2329* (2013.01); *G01C 21/3602* (2013.01); *G01S 7/4817* (2013.01);
(Continued)

(58) Field of Classification Search
CPC ..... B60R 1/00; G01C 21/3602; G01S 17/023; G01S 17/42; G01S 17/87; G01S 17/89; G01S 17/936; G01S 7/4817; G01S 7/497; G01S 7/4972; G05D 1/0088; G05D 1/0231; G05D 1/0248; G05D 1/0287;
(Continued)

(56) References Cited

U.S. PATENT DOCUMENTS

2007/0291130 A1  12/2007 Broggi et al.
2010/0253540 A1  10/2010 Seder et al.
(Continued)

OTHER PUBLICATIONS

Blaga et al. "Online Cross-Calibration of Camera and LIDAR", presented on Sep. 7-9, 2017 in the 2017 13th IEEE International Conference on Intelligent Computer Communication and Processing (ICCP), Date Added to IEEE Xplore: Nov. 23, 2017.*

(Continued)

*Primary Examiner* — Mohammed S Rahaman
(74) *Attorney, Agent, or Firm* — Maschoff Brennan

(57) ABSTRACT

A method and system for synchronizing a lidar and a camera on an autonomous vehicle. The system instructs the camera to detect light columns transmitted by the lidar. The system iterates through various start times for the camera. The system instructs the lidar to emit a plurality of light columns at a lidar frequency. The system instructs the camera to capture images at a camera frequency starting at each start time. The system analyzes the image data received from the cameras to identify light columns captured in the images. The system calculates an alignment score for each of the many start times based on the identified light columns. The start time with the optimal alignment score is selected and used to synchronize the lidar and the camera. With lidar data detected by the synchronized lidar and image data captured by the synchronized camera, the system may navigate the autonomous vehicle.

30 Claims, 17 Drawing Sheets

Related U.S. Application Data

(60) Provisional application No. 62/574,744, filed on Oct. 19, 2017.

(51) Int. Cl.

| | | |
|---|---|---|
| *G01S 17/86* | (2020.01) | |
| *G01S 17/931* | (2020.01) | |
| *G01S 7/497* | (2006.01) | |
| *G01S 17/89* | (2020.01) | |
| *G05D 1/02* | (2020.01) | |
| *G06T 7/80* | (2017.01) | |
| *G06T 7/13* | (2017.01) | |
| *G01S 17/42* | (2006.01) | |
| *G01S 7/481* | (2006.01) | |
| *G05D 1/00* | (2006.01) | |
| *G06T 7/55* | (2017.01) | |
| *G06T 7/33* | (2017.01) | |
| *G01C 21/36* | (2006.01) | |
| *H04N 5/04* | (2006.01) | |
| *H04N 13/106* | (2018.01) | |
| *H04N 5/225* | (2006.01) | |
| *H04N 5/247* | (2006.01) | |
| *B60R 1/00* | (2006.01) | |
| *G06K 9/00* | (2006.01) | |
| *G06K 9/62* | (2006.01) | |

(52) U.S. Cl.
CPC .......... *G01S 7/497* (2013.01); *G01S 7/4972* (2013.01); *G01S 17/42* (2013.01); *G01S 17/86* (2020.01); *G01S 17/87* (2013.01); *G01S 17/89* (2013.01); *G01S 17/931* (2020.01); *G05D 1/0088* (2013.01); *G05D 1/0231* (2013.01); *G05D 1/0248* (2013.01); *G06T 7/13* (2017.01); *G06T 7/33* (2017.01); *G06T 7/55* (2017.01); *G06T 7/80* (2017.01); *H04N 5/04* (2013.01); *H04N 5/232* (2013.01); *H04N 13/106* (2018.05); *B60R 1/00* (2013.01); *G05D 1/0287* (2013.01); *G05D 2201/0213* (2013.01); *G06K 9/00791* (2013.01); *G06K 9/6202* (2013.01); *G06T 2207/10028* (2013.01); *G06T 2207/10048* (2013.01); *G06T 2207/20092* (2013.01); *G06T 2207/20221* (2013.01); *G06T 2207/30241* (2013.01); *G06T 2207/30242* (2013.01); *G06T 2207/30252* (2013.01); *H04N 5/2253* (2013.01); *H04N 5/247* (2013.01)

(58) Field of Classification Search
CPC ....... G05D 2201/0213; G06K 9/00791; G06K 9/6202; G06T 2207/10028; G06T 2207/10048; G06T 2207/20092; G06T 2207/20221; G06T 2207/30241; G06T 2207/30242; G06T 2207/30252; G06T 7/13; G06T 7/33; G06T 7/55; G06T 7/80; H04N 5/04; H04N 5/2253; H04N 5/232; H04N 5/247
See application file for complete search history.

(56) References Cited

U.S. PATENT DOCUMENTS

| | | |
|---|---|---|
| 2014/0049765 A1 | 2/2014 | Zheleznyak et al. |
| 2014/0159925 A1* | 6/2014 | Mimeault .............. G01S 17/58 340/935 |
| 2014/0160291 A1 | 6/2014 | Schaffner |
| 2015/0254781 A1* | 9/2015 | Binion ................. G07C 5/0858 701/32.2 |
| 2016/0018524 A1 | 1/2016 | Zeng |
| 2016/0034771 A1* | 2/2016 | Schamp .............. B60G 17/019 348/148 |
| 2016/0209846 A1 | 7/2016 | Eustice et al. |
| 2017/0124781 A1* | 5/2017 | Douillard ............. G01S 15/931 |
| 2017/0242442 A1* | 8/2017 | Minster ................ G05D 1/0248 |
| 2017/0287335 A1 | 10/2017 | Ansari |
| 2019/0011567 A1* | 1/2019 | Pacala ................ G06K 9/00805 |
| 2020/0174130 A1* | 6/2020 | Banerjee ............. G05D 1/0248 |

OTHER PUBLICATIONS

Levinson, J. et al., "Automatic Online Calibration of Cameras and Lasers," Robotics: C2 Science and Systems, Jun. 24-28, 2013, pp. 1-8.*

Park, Y. et al., "Calibration between Color Camera and 3D LIDAR Instruments with a Polygonal Planar Board," Sensors 14, Mar. 17, 2014, pp. 5333-5353.*

Pusztai, Z. et al., Accurate Calibration of LiDAR-Camera Systems using Ordinary Boxes, IEEE International Conference on Computer Vision Workshops, Oct. 22-29, 2017, pp. 394-402.*

Blaga, B. et al., "Online Cross-Calibration of Camera and LIDAR," 2017 13th IEEE International Conference on Intelligent Computer Communication and Processing (ICCP), Sep. 7-9, 2017, eight pages, Cluj-Napoca, Romania.

Eggert, D. W. et al., Estimating 3-D rigid body transformations: a comparison of four major algorithms, Machine Vision and Applications, 1997, pp. 272-290.

Levinson, J. et al., "Automatic Online Calibration of Cameras and Lasers," Robotics: Science and Systems, Jun. 24-28, 2013, pp. 1-8.

Levinson, J. et al., "Towards Fully Autonomous Driving: Systems and Algorithms," IEEE Intelligent Vehicles Symposium (IV) 2011, pp. 1-6.

Lorusso, A. et al., "A Comparison of Four Algorithms for Estimating 3-D Rigid Transformations," British Machine Vision Conference, 1995, pp. 237-246.

PCT International Search Report and Written Opinion, PCT Application No. PCT/US2018/056367, dated Jan. 11, 2019, 13 pages.

PCT International Search Report and Written Opinion, PCT Application No. PCT/US2018/055964, dated Jan. 8, 2019, 17 pages.

PCT Invitation to Pay Additional Fees and, Where Applicable, Protest Fee, PCT Application No. PCT/US2018/055940, Nov. 28, 2018, 2 pages.

Segal, A. V. et al., "Generalized-ICP," Robotics: Science and Systems, Jun. 2009, pp. 1-8.

Sivaraman, S. et al., "Looking at Vehicles on the Road: A Survey of Vision-Based Vehicle Detection, Tracking, and Behavior Analysis," IEEE Transactions on Intelligent Transportation Systems, vol. 14, No. 4, Dec. 2013, pp. 1773-1795.

United States Office Action, U.S. Appl. No. 16/163,463, dated Jul. 18, 2019, 12 pages.

Velas, M. et al., "Calibration of RGB Camera With Velodyne LiDAR," 2014, pp. 1-10.

* cited by examiner

Lidar Projection to Camera Image
400

Obtain track sample comprising a lidar scan captured at a lidar timestamp, a camera image at a camera timestamp, and consecutive poses inclusive of the duration of the track sample
410

Project lidar scan onto the camera image for the track sample
420

Compute an unwinding transform with the consecutive poses
422

Unwind lidar scan according to the unwinding transform for the camera timestamp
424

Project lidar scan onto the camera image
426

Localize vehicle with lidar projection
430

Update HD map with lidar projection
440

FIG. 4

LIDAR AND CAMERA SYNCHRONIZATION

CROSS REFERENCE TO RELATED APPLICATIONS

This application is a divisional application of co-pending U.S. application Ser. No. 16/163,463 filed on Oct. 17, 2018, which claims the benefit and priority of U.S. Provisional Application No. 62/574,744 filed Oct. 19, 2017, both of which are incorporated by reference herein in their entirety.

BACKGROUND

Field of the Art

This disclosure generally relates to synchronization of sensors of vehicles, for example, autonomous vehicles, and more particularly to synchronization of lidars and cameras installed on a vehicle for use in generation of high definition maps.

Prior Art

Autonomous vehicles, also known as self-driving cars, driverless cars, auto, or robotic cars, drive from a source location to a destination location without requiring a human driver to control and navigate the vehicle. Automation of driving is difficult due to several reasons. For example, autonomous vehicles use sensors to make driving decisions on the fly, but vehicle sensors cannot observe everything all the time. Vehicle sensors can be obscured by corners, rolling hills, and other vehicles. Vehicles sensors may not observe certain things early enough to make decisions. In addition, lanes and signs may be missing on the road or knocked over or hidden by bushes, and therefore not detectable by sensors. Furthermore, road signs for rights of way may not be readily visible for determining from where vehicles could be coming, or for swerving or moving out of a lane in an emergency or when there is a stopped obstacle that must be passed.

Autonomous vehicles can use map data to figure out some of the above information instead of relying on sensor data. However conventional maps have several drawbacks that make them difficult to use for an autonomous vehicle. For example maps do not provide the level of accuracy required for safe navigation (e.g., 10 cm or less). GPS systems provide accuracies of approximately 3-5 meters, but have large error conditions resulting in an accuracy of over 100 m. This makes it challenging to accurately determine the location of the vehicle. In particular, various sensors used by the autonomous vehicles for navigation have varying parameters that can introduce discrepancies between data collected from the different sensors.

Autonomous vehicles use various different sensors for self-driving, for example, lidar and camera sensors. Each sensor of the autonomous vehicle, may use its own coordinate system. Different sensors may record data at their own pace, for example, a VELODYNE light detection and ranging sensor (lidar or lidar) may collect scans at 10 Hz, while cameras may collect frames at 30 Hz, and the GPS/IMU may collect data at 100 Hz. For example, the lidar may use one coordinate system and a camera may use another coordinate system. Data from different sensors are timestamped by different clocks. For example, GPS uses satellite time, VELODYNE lidar uses an internal clock but can also take external triggering signals, and many cameras do not have internal clock and use system clock. As a result, there can be problems in processing sensor data. The clocks used by different sensors usually do not agree with each other. For example, the system clock can drift over time while the satellite time is accurate. Also, some sensor data is not timestamped at time of capture, but is timestamped at the time of delivery. For example, camera frames may not be timestamped when the pixels are half way through exposure, but when the full image has been delivered to system memory buffer. Depending on how data is buffered and transferred, there can be a significant delay. Poor synchronization creates problems when the HD map system combines data from multiple sources, for either map creation or localization. E.g., the HD map system could end up coloring a point cloud with camera images captured 10 milliseconds earlier, thus many high definition map cells may get assigned wrong color. False color has further effect on downstream processes such as feature labeling, for example, labeled lane lines may shift from their true location due to false color in high definition map cells.

SUMMARY

Navigational systems for vehicles depend on accurate and precise sensor data. The sensor data received from various sensors on a vehicle need not only be accurate and precise on their own regards but also need to be precise relative to one another. In particular, utilization of lidar scans in tandem with camera images relies on some degree of precision in internal clocks within the lidar and the camera image. Embodiments of this invention allow synchronization of a lidar and a camera on an autonomous vehicle with a high degree of precision, e.g., less than 5 milliseconds.

Embodiments synchronize a lidar and a camera on an autonomous vehicle using analysis of track samples recorded by the lidar and the camera. The system selects a plurality of track samples for a route including a lidar scan and an image. For each track sample, the system calculates a time shift by iterating many time deltas. For each time delta, the system adjusts a camera timestamp by that time delta, projecting a lidar scan onto the image as a lidar projection according to the adjusted camera timestamp, and calculating an alignment score of the lidar projection for that time delta. The system defines the time shift for each track sample as the time delta with the highest alignment score. The system models time drift of the camera compared to the lidar based on the calculated time shifts for the track samples and synchronizes the lidar and the camera according to the modeled time drift.

Another embodiment synchronizes a lidar and a camera by instructing the camera to detect light columns transmitted by the lidar onto a reflective surface. The system iterates through various start times for the camera. The system instructs the lidar to emit a plurality of light columns against the reflective surface at a lidar frequency. The system then instructs the camera to capture images at a camera frequency starting at each start time. The system analyzes the image data received from the cameras to identify light columns captured in the images. The system then calculates an alignment score for each of the many start times based on the identified light columns. The start time with the optimal alignment score is selected and used to synchronize the lidar and the camera.

BRIEF DESCRIPTION OF THE DRAWINGS

FIG. 4 illustrates a flowchart describing a process of projecting lidar data onto an image for use by the navigational system, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Navigational systems for vehicles depend on accurate and precise sensor data. The sensor data received from various sensors on a vehicle need not only be accurate and precise on their own regards but also need to be precise relative to one another. In particular, utilization of lidar scans in tandem with camera images rely on some degree of precision in internal clocks within the lidar and the camera image. Embodiments of this invention allow synchronization of a lidar and a camera on an autonomous vehicle with a high degree of precision, e.g., less than 5 milliseconds. In an embodiment, the synchronization is performed in real-time while the vehicle is being driven. Furthermore, the synchronization is performed automatically and the vehicle does not have to be taken to an expert for performing synchronization.

Navigational System Environment

Figure 1:
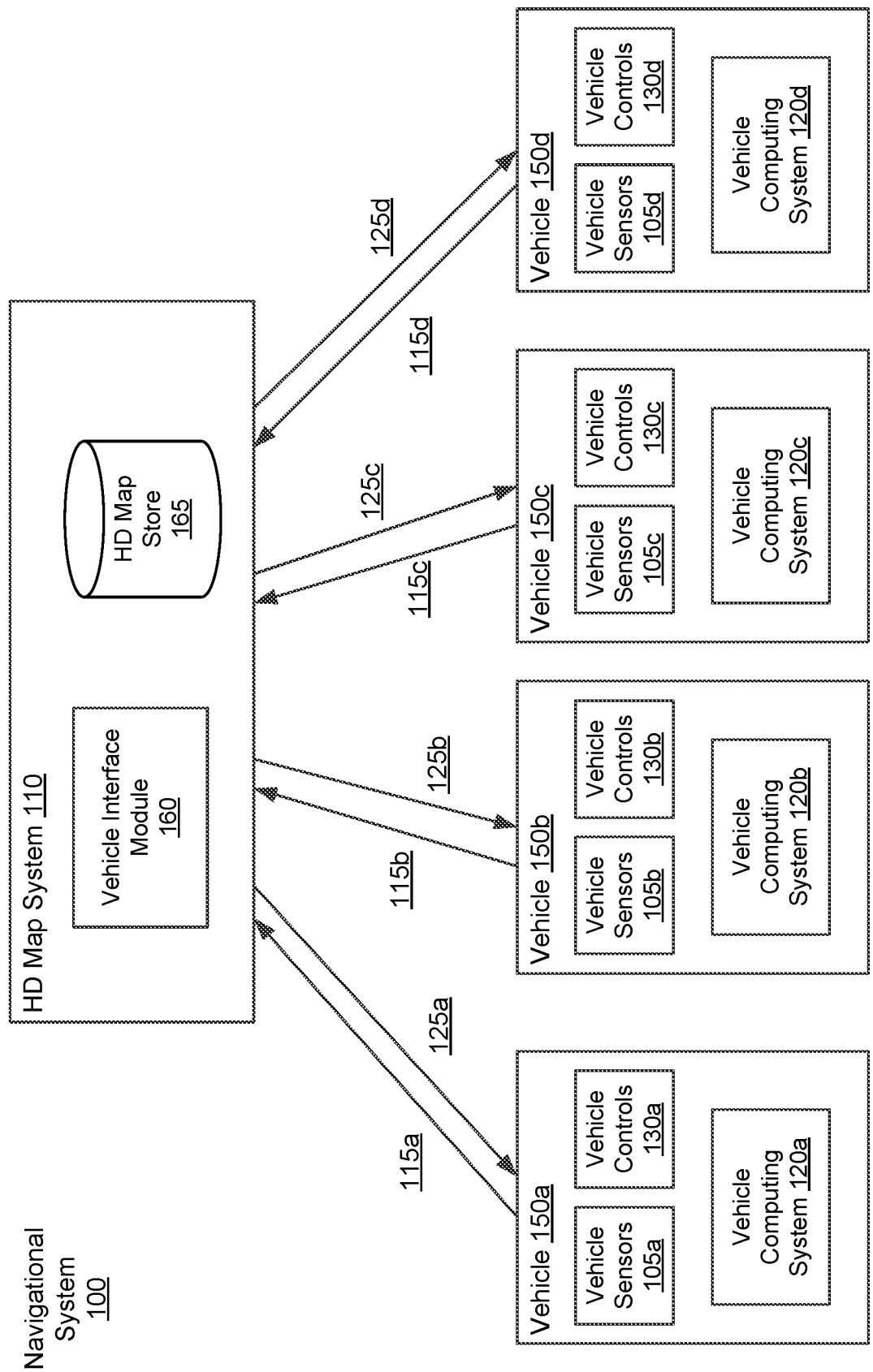
FIG. 1 illustrates an overall system environment of an HD map system interacting with multiple vehicle computing systems, according to an embodiment.

FIG. 1 shows an overall navigational system environment 100 of an HD map system 110 interacting with multiple vehicles 150, according to an embodiment. The navigational system environment 100 includes an HD map system 110 that interacts with a plurality of vehicles 150. The vehicles 150 may be autonomous vehicles but are not required to be. The HD map system 110 receives sensor data captured by sensors of the vehicles, and combines the data received from the vehicles 150 to generate and maintain HD maps. The HD map system 110 sends HD map data to the vehicles for use in driving the vehicles. In an embodiment, the HD map system 110 is implemented as a distributed computing system, for example, a cloud based service that allows clients such as vehicle computing systems 120 to make requests for information and services. For example, a vehicle computing system 120 may make a request for HD map data for driving along a route and the HD map system 110 provides the requested HD map data.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 10:
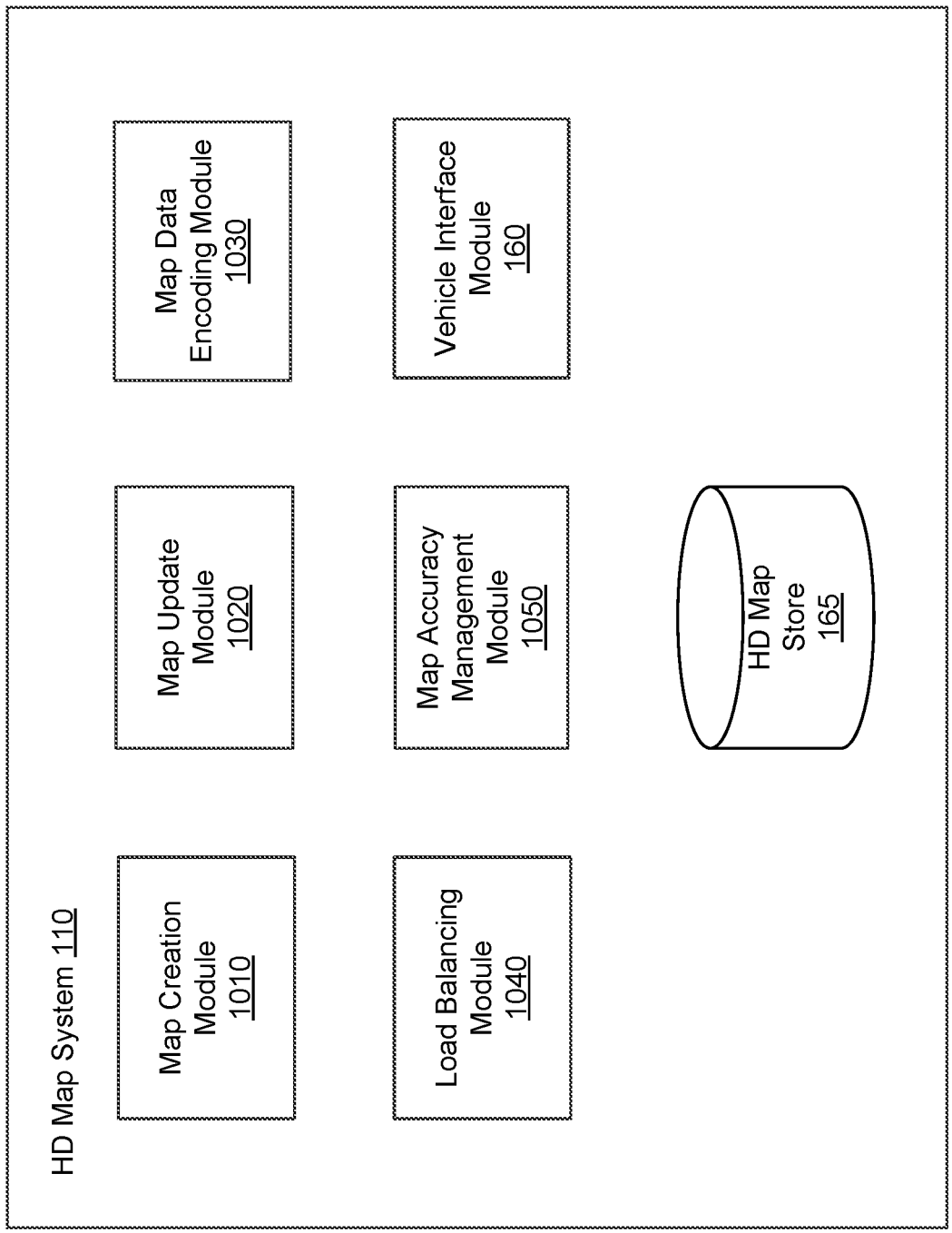
FIG. 10 illustrates the system architecture of an HD map system, according to an embodiment.

The HD map system 110 comprises a vehicle interface module 160 and an HD map store 165. The HD map system 110 interacts with the vehicle computing system 120 of various vehicles 150 using the vehicle interface module 160. The HD map system 110 stores map information for various geographical regions in the HD map store 165. The HD map system 110 may include other modules than those shown in FIG. 1, for example, various other modules as illustrated in FIG. 10 and further described herein.

The HD map system 110 receives 115 data collected by sensors of a plurality of vehicles 150, for example, hundreds or thousands of cars. The vehicles provide sensor data captured while driving along various routes and send it to the HD map system 110. The HD map system 110 uses the data received from the vehicles 150 to create and update HD maps describing the regions in which the vehicles 150 are driving. The HD map system 110 builds high definition maps based on the collective information received from the vehicles 150 and stores the HD map information in the HD map store 165.

The HD map system 110 sends 125 HD maps to individual vehicles 150 as required by the vehicles 150. For example, if an autonomous vehicle needs to drive along a route, the vehicle computing system 120 of the autonomous vehicle provides information describing the route being traveled to the HD map system 110. In response, the HD map system 110 provides the required HD maps for driving along the route.

In an embodiment, the HD map system 110 sends portions of the HD map data to the vehicles in a compressed format so that the data transmitted consumes less bandwidth. The HD map system 110 receives from various vehicles, information describing the data that is stored at the local HD map store 275 of the vehicle. If the HD map system 110 determines that the vehicle does not have certain portion of the HD map stored locally in the local HD map store 275, the HD map system 110 sends that portion of the HD map to the vehicle. If the HD map system 110 determines that the vehicle did previously receive that particular portion of the HD map but the corresponding data was updated by the HD map system 110 since the vehicle last received the data, the HD map system 110 sends an update for that portion of the HD map stored at the vehicle. This allows the HD map system 110 to minimize the amount of data that is communicated with the vehicle and also to keep the HD map data stored locally in the vehicle updated on a regular basis.

A vehicle 150 includes vehicle sensors 105, vehicle controls 130, and a vehicle computing system 120. The vehicle sensors 105 allow the vehicle 150 to detect the surroundings of the vehicle as well as information describing the current state of the vehicle, for example, information describing the location and motion parameters of the vehicle. The vehicle sensors 105 comprise at least a camera, a light detection and ranging sensor (lidar), a global positioning system (GPS) navigation system, and an inertial measurement unit (IMU), among other various sensors. The vehicle has one or more cameras that capture images of the surroundings of the vehicle. A lidar surveys the surroundings of the vehicle by measuring distance to a target by illuminating that target with a laser light pulses, and measuring the reflected pulses. The lidar may emit laser light pulses along a vertical light column which may be revolved in 360°. When revolving in 360°, each laser light pulse in the vertical light column creates a lidar scan line. The detected pulses reflected off objects in the surrounding area are recorded as lidar point clouds. In one instance of scanning by the lidar, the lidar records the detected lidar point clouds as a lidar scan. Each detected pulse is used by the lidar to calculate a distance traveled by the pulse. The lidar may additionally record a reflective intensity of each detected pulse, wherein various objects or surfaces have varying reflective properties—e.g., a mirror has a different reflectance compared to a piece of cloth. The GPS navigation system determines the position of the vehicle based on signals from satellites. An IMU is an electronic device that measures and reports motion data of the vehicle such as velocity, acceleration, and direction of movement, speed, angular rate, and so on using a combination of accelerometers and gyroscopes or other measuring instruments.

The vehicle controls 130 control the physical movement of the vehicle, for example, acceleration, direction change, starting, stopping, and so on. The vehicle controls 130 include the machinery for controlling the accelerator, brakes, steering wheel, and so on. The vehicle computing system 120 continuously provides control signals to the vehicle controls 130, thereby causing an autonomous vehicle to drive along a selected route.

Figure 2:
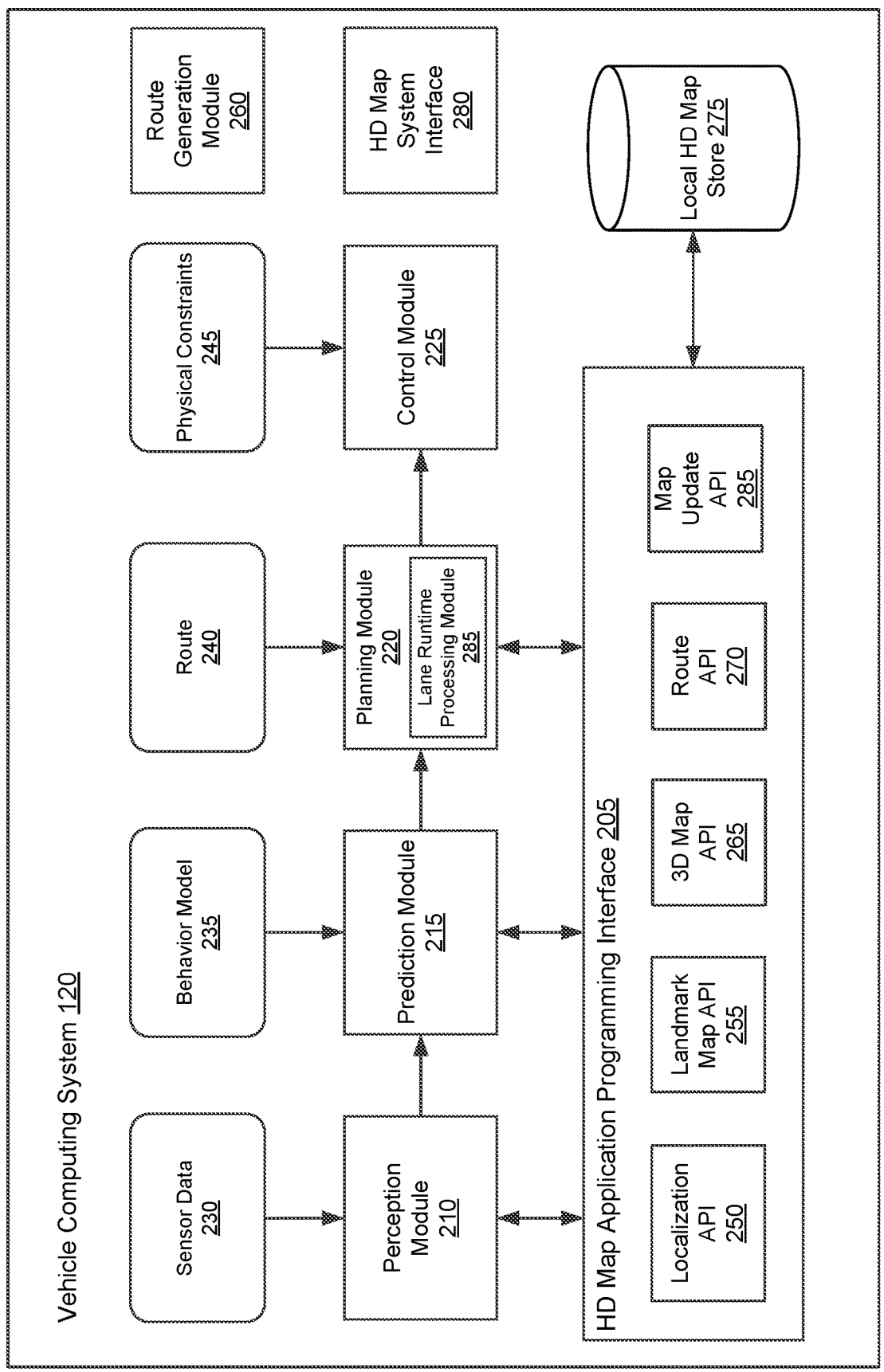
FIG. 2 illustrates the system architecture of a vehicle computing system, according to an embodiment.

The vehicle computing system 120 performs various tasks including processing data collected by the sensors as well as map data received from the HD map system 110. The vehicle computing system 120 also processes data for sending to the HD map system 110. Details of the vehicle computing system are illustrated in FIG. 2 and further described in connection with FIG. 2.

The interactions between the vehicle computing systems 120 and the HD map system 110 are typically performed via a network, for example, via the Internet. The network enables communications between the vehicle computing systems 120 and the HD map system 110. In one embodiment, the network uses standard communications technologies and/or protocols. The data exchanged over the network can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Computing Machine Architecture

Figure 15:
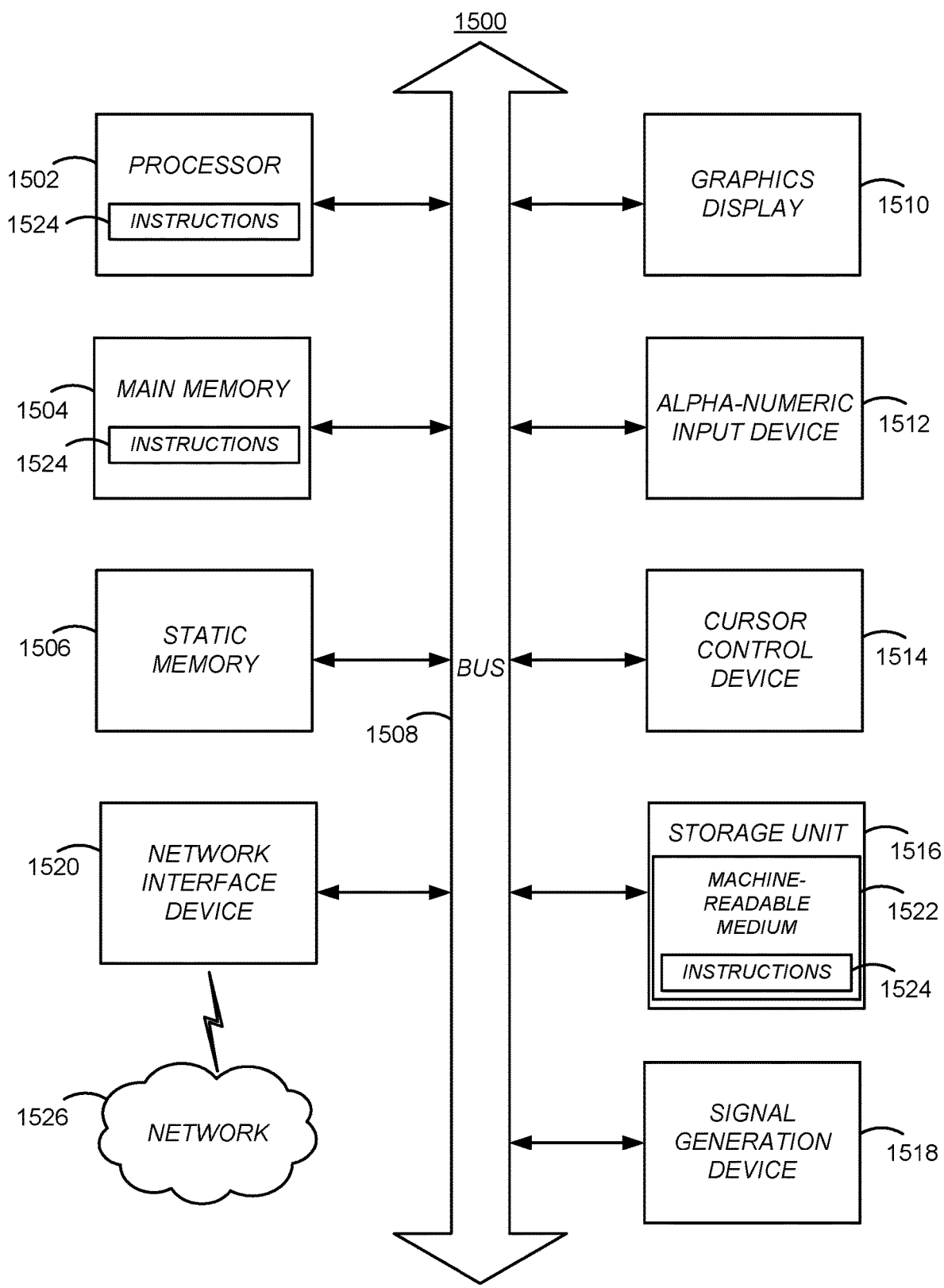
FIG. 15 illustrates an embodiment of a computing machine that can read instructions from a machine-readable medium and execute the instructions in a processor or controller.

Reference is now made to FIG. 15 which presents an example computing system; the structure, the operations, and the functions thereof may be implemented in any of the computing systems discussed herein this disclosure.

FIG. 15 is a block diagram illustrating components of an example computing system able to read instructions from a machine-readable medium and execute them in a processor (or controller). Specifically, FIG. 15 shows a diagrammatic representation of a machine in the example form of a computing system 1500 within which instructions 1524 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The computing system may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1524 (sequential or otherwise) that specify actions to be taken by that machine. Further, while only a single machine is illustrated, the term "machine" shall also be taken to include any collection of machines that individually or jointly execute instructions 1524 to perform any one or more of the methodologies discussed herein.

The example computing system 1500 includes a processor 1502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1504, and a static memory 1506, which are configured to communicate with each other via a bus 1508. The computing system 1500 may further include graphics display unit 1510 (e.g., a plasma display panel (PDP), a liquid crystal display (LCD), a projector, or a cathode ray tube (CRT)). The computing system 1500 may also include alphanumeric input device 1512 (e.g., a keyboard), a cursor control device 1514 (e.g., a mouse, a trackball, a joystick, a motion sensor, or other pointing instrument), a storage unit 1516, a signal generation device 1518 (e.g., a speaker), and a network interface device 1520, which also are configured to communicate via the bus 1508.

The storage unit 1516 includes a machine-readable medium 1522 on which is stored instructions 1524 (e.g., software) embodying any one or more of the methodologies or functions described herein. The instructions 1524 (e.g., software) may also reside, completely or at least partially, within the main memory 1504 or within the processor 1502 (e.g., within a processor's cache memory) during execution thereof by the computing system 1500, the main memory 1504 and the processor 1502 also constituting machine-readable media. The instructions 1524 (e.g., software) may be transmitted or received over a network 1526 via the network interface device 1520.

While machine-readable medium 1522 is shown in an example embodiment to be a single medium, the term "machine-readable medium" should be taken to include a single medium or multiple media (e.g., a centralized or distributed database, or associated caches and servers) able to store instructions (e.g., instructions 1524). The term "machine-readable medium" shall also be taken to include any medium that is capable of storing instructions (e.g., instructions 1524) for execution by the machine and that cause the machine to perform any one or more of the methodologies disclosed herein. The term "machine-readable medium" includes, but not be limited to, data repositories in the form of solid-state memories, optical media, and magnetic media.

Vehicle Computing System Architecture

FIG. 2 shows the system architecture of a vehicle computing system 120, according to an embodiment. The vehicle computing system 120 may implement the structure, operations, and functions of the example computing system 1500 described above. The vehicle computing system 120 comprises a perception module 210, prediction module 215, planning module 220, a control module 225, a local HD map store 275, an HD map system interface 280, and an HD map application programming interface (API) 205. The various modules of the vehicle computing system 120 process various type of data including sensor data 230, a behavior model 235, routes 240, and physical constraints 245. In other embodiments, the vehicle computing system 120 may have more or fewer modules. Functionality described as being implemented by a particular module may be implemented by other modules.

The perception module 210 receives sensor data 230 from the sensors 105 of the vehicle 150. This includes image data (e.g., images and/or video) collected by one or more cameras on the vehicle 150, lidar data captured by a lidar on the vehicle 150, IMU data collected by an IMU on the vehicle 150, GPS data collected by a GPS navigation system, and so on. In some embodiments, the sensor data 230 may be collated into track samples along a route, with each track sample including lidar data captured at a lidar timestamp, one or more images captured at a camera timestamp. The perception module 210 uses the sensor data to determine what objects are around the vehicle, the details of the road on which the vehicle is travelling, and so on. The perception module 210 processes the sensor data 230 to populate data structures storing the sensor data and provides the information to the prediction module 215. An embodiment of the perception module 210 is further described below in reference to FIG. 3.

The prediction module 215 interprets the data provided by the perception module using behavior models of the objects perceived to determine whether an object is moving or likely to move. For example, the prediction module 215 may determine that objects representing road signs are not likely to move, whereas objects identified as vehicles, people, and so on, are either moving or likely to move. The prediction module 215 uses the behavior models 235 of various types of objects to determine whether they are likely to move. The prediction module 215 provides the predictions of various objects to the planning module 200 to plan the subsequent actions that the vehicle needs to take next.

The planning module 200 receives the information describing the surroundings of the vehicle from the prediction module 215, the route 240 that determines the destination of the vehicle, and the path that the vehicle should take to get to the destination. The planning module 200 uses the information from the prediction module 215 and the route 240 to plan a sequence of actions that the vehicle needs to take within a short time interval, for example, within the next few seconds. In an embodiment, the planning module 200 specifies the sequence of actions as one or more points representing nearby locations that the vehicle needs to drive through next.

The planning module 200 provides the details of the plan comprising the sequence of actions to be taken by the vehicle to the control module 225. The plan may determine the subsequent action of the vehicle, for example, whether the vehicle performs a lane change, a turn, acceleration by increasing the speed or slowing down, and so on.

The control module 225 determines the control signals for sending to the controls 130 of the vehicle based on the plan received from the planning module 200. For example, if the vehicle is currently at point A and the plan specifies that the vehicle should next go to a nearby point B, the control module 225 determines the control signals for the controls 130 that would cause the vehicle to go from point A to point B in a safe and smooth way, for example, without taking any sharp turns or a zig zag path from point A to point B. The path taken by the vehicle to go from point A to point B may depend on the current speed and direction of the vehicle as well as the location of point B with respect to point A. For example, if the current speed of the vehicle is high, the vehicle may take a wider turn compared to a vehicle driving slowly.

The control module 225 also receives physical constraints 245 as input. These include the physical capabilities of that specific vehicle. For example, a car having a particular make and model may be able to safely make certain types of vehicle movements such as acceleration, and turns that another car with a different make and model may not be able to make safely. The control module 225 incorporates these physical constraints in determining the control signals.

The control module 225 sends the control signals to the vehicle controls 130 that cause the vehicle to execute the specified sequence of actions causing the vehicle to move as planned. The above steps are constantly repeated every few seconds causing the vehicle to drive safely along the route that was planned for the vehicle.

The various modules of the vehicle computing system 120 including the perception module 210, prediction module 215, and planning module 220 receive map information to perform their respective computation. The vehicle 150 stores the HD map data in the local HD map store 275. The modules of the vehicle computing system 120 interact with the map data using the HD map API 205 that provides a set of application programming interfaces (APIs) that can be invoked by a module for accessing the map information. The HD map system interface 280 allows the vehicle computing system 120 to interact with the HD map system 110 via a network (not shown in the Figures). The local HD map store 275 stores map data in a format specified by the HD Map system 110. The HD map API 205 is capable of processing the map data format as provided by the HD Map system 110. The HD Map API 205 provides the vehicle computing system 120 with an interface for interacting with the HD map data. The HD map API 205 includes several APIs including the localization API 250, the landmark map API 255, the route API 265, the 3D map API 270, the map update API 285, and so on.

The localization APIs 250 determine the current location of the vehicle, for example, when the vehicle starts and as the vehicle moves along a route. The localization APIs 250 include a localize API that determines an accurate location of the vehicle within the HD Map. The vehicle computing system 120 can use the location as an accurate relative positioning for making other queries, for example, feature queries, navigable space queries, and occupancy map queries further described herein. The localize API receives inputs comprising one or more of, location provided by GPS, vehicle motion data provided by IMU, lidar data, and images. The localize API returns an accurate location of the vehicle as latitude and longitude coordinates. The coordinates returned by the localize API are more accurate compared to the GPS coordinates used as input, for example, the output of the localize API may have precision range from 5-10 cm. In one embodiment, the vehicle computing system 120 invokes the localize API to determine location of the vehicle periodically based on the lidar data, for example, at a frequency of 10 Hz. The vehicle computing system 120 may invoke the localize API to determine the vehicle location at a higher rate (e.g., 60 Hz) if GPS/IMU data is available at that rate. The vehicle computing system 120 stores as internal state, location history records to improve accuracy of subsequent localize calls. The location history record stores history of location from the point-in-time, when the car was turned off/stopped. The localization APIs 250 include a localize-route API generates an accurate route specifying lanes based on the HD map. The localize-route API takes as input a route from a source to destination via a third party maps and generates a high precision routes represented as a connected graph of navigable lanes along the input routes based on HD maps.

The landmark map API 255 provides the geometric and semantic description of the world around the vehicle, for example, description of various portions of lanes that the vehicle is currently travelling on. The landmark map APIs 255 comprise APIs that allow queries based on landmark maps, for example, fetch-lanes API and fetch-features API. The fetch-lanes API provide lane information relative to the vehicle and the fetch-features API. The fetch-lanes API receives as input a location, for example, the location of the vehicle specified using latitude and longitude of the vehicle and returns lane information relative to the input location. The fetch-lanes API may specify a distance parameters indicating the distance relative to the input location for which the lane information is retrieved. The fetch-features API receives information identifying one or more lane elements and returns landmark features relative to the specified lane elements. The landmark features include, for each landmark, a spatial description that is specific to the type of landmark.

The 3D map API 265 provides efficient access to the spatial 3-dimensional (3D) representation of the road and various physical objects around the road as stored in the local HD map store 275. The 3D map APIs 965 include a fetch-navigable-surfaces API and a fetch-occupancy-grid API. The fetch-navigable-surfaces API receives as input, identifiers for one or more lane elements and returns navigable boundaries for the specified lane elements. The fetch-occupancy-grid API receives a location as input, for example, a latitude and longitude of the vehicle, and returns information describing occupancy for the surface of the road and all objects available in the HD map near the location. The information describing occupancy includes a hierarchical volumetric grid of all positions considered occupied in the map. The occupancy grid includes information at a high resolution near the navigable areas, for example, at curbs and bumps, and relatively low resolution in less significant areas, for example, trees and walls beyond a curb. The fetch-occupancy-grid API is useful for detecting obstacles and for changing direction if necessary.

The 3D map APIs also include map update APIs, for example, download-map-updates API and upload-map-updates API. The download-map-updates API receives as input a planned route identifier and downloads map updates for data relevant to all planned routes or for a specific planned route. The upload-map-updates API uploads data collected by the vehicle computing system 120 to the HD map system 110. This allows the HD map system 110 to keep the HD map data stored in the HD map system 110 up to date based on changes in map data observed by sensors of vehicles driving along various routes.

The route API 270 returns route information including full route between a source and destination and portions of route as the vehicle travels along the route. The 3D map API 965 allows querying the HD Map. The route APIs 270 include add-planned-routes API and get-planned-route API. The add-planned-routes API provides information describing planned routes to the HD map system 110 so that information describing relevant HD maps can be downloaded by the vehicle computing system 120 and kept up to date. The add-planned-routes API receives as input, a route specified using polylines expressed in terms of latitudes and longitudes and also a time-to-live (TTL) parameter specifying a time period after which the route data can be deleted. Accordingly, the add-planned-routes API allows the vehicle to indicate the route the vehicle is planning on taking in the near future as an autonomous trip. The add-planned-route API aligns the route to the HD map, records the route and its TTL value, and makes sure that the HD map data for the route stored in the vehicle computing system 120 is up to date. The get-planned-routes API returns a list of planned routes and provides information describing a route identified by a route identifier.

The map update API 285 manages operations related to update of map data, both for the local HD map store 275 and for the HD map store 165 stored in the HD map system 110. Accordingly, modules in the vehicle computing system 120 invoke the map update API 285 for downloading data from the HD map system 110 to the vehicle computing system 120 for storing in the local HD map store 275 as necessary. The map update API 285 also allows the vehicle computing system 120 to determine whether the information monitored by the vehicle sensors 105 indicates a discrepancy in the map information provided by the HD map system 110 and uploads data to the HD map system 110 that may result in the HD map system 110 updating the map data stored in the HD map store 165 that is provided to other vehicles 150.

FIG. 10 illustrates the various layers of instructions in the HD Map API 205 of a vehicle computing system 120, according to an embodiment. Different manufacturer of vehicles have different instructions for receiving information from vehicle sensors 105 and for controlling the vehicle controls 130. Furthermore, different vendors provide different computer platforms with autonomous driving capabilities, for example, collection and analysis of vehicle sensor data.

Examples of computer platforms for autonomous vehicles include platforms provided vendors, such as NVIDIA, QUALCOMM, and INTEL. These platforms provide functionality for use by autonomous vehicle manufacturers in manufacture of autonomous vehicles. A vehicle manufacturer can use any one or several computer platforms for autonomous vehicles. The HD map system 110 provides a library for processing HD maps based on instructions specific to the manufacturer of the vehicle and instructions specific to a vendor specific platform of the vehicle. The library provides access to the HD map data and allows the vehicle to interact with the HD map system 110.

Figure 9:
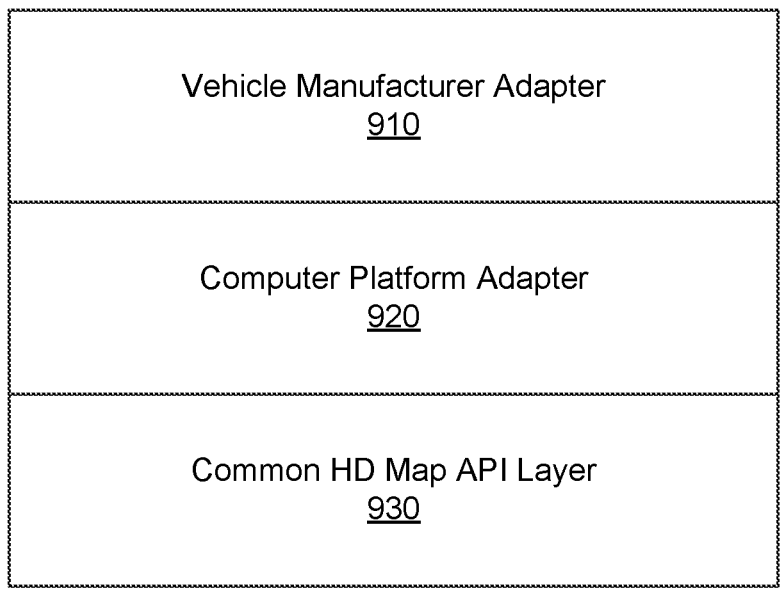
FIG. 9 illustrates the various layers of instructions in the HD Map API of a vehicle computing system, according to an embodiment.

As shown in FIG. 9, in an embodiment, the HD map API is implemented as a library that includes a vehicle manufacturer adapter 910, a computer platform adapter 920, and a common HD map API layer 930. The common HD map API layer comprises generic instructions that can be used across a plurality of vehicle computer platforms and vehicle manufacturers. The computer platform adapter 920 include instructions that are specific to each computer platform. For example, the common HD Map API layer 930 may invoke the computer platform adapter 920 to receive data from sensors supported by a specific computer platform. The vehicle manufacturer adapter 910 comprises instructions specific to a vehicle manufacturer. For example, the common HD map API layer 930 may invoke functionality provided by the vehicle manufacturer adapter 910 to send specific control instructions to the vehicle controls 130.

The HD map system 110 stores computer platform adapters 920 for a plurality of computer platforms and vehicle manufacturer adapters 910 for a plurality of vehicle manufacturers. The HD map system 110 determines the particular vehicle manufacturer and the particular computer platform for a specific autonomous vehicle. The HD map system 110 selects the vehicle manufacturer adapter 910 for the particular vehicle manufacturer and the computer platform adapter 920 the particular computer platform of that specific vehicle. The HD map system 110 sends instructions of the selected vehicle manufacturer adapter 910 and the selected computer platform adapter 920 to the vehicle computing system 120 of that specific autonomous vehicle. The vehicle computing system 120 of that specific autonomous vehicle installs the received vehicle manufacturer adapter 910 and the computer platform adapter 920. The vehicle computing system 120 periodically checks if the HD map system 110 has an update to the installed vehicle manufacturer adapter 910 and the computer platform adapter 920. If a more recent update is available compared to the version installed on the vehicle, the vehicle computing system 120 requests and receives the latest update and installs it.

Perception Module Architecture

Figure 3:
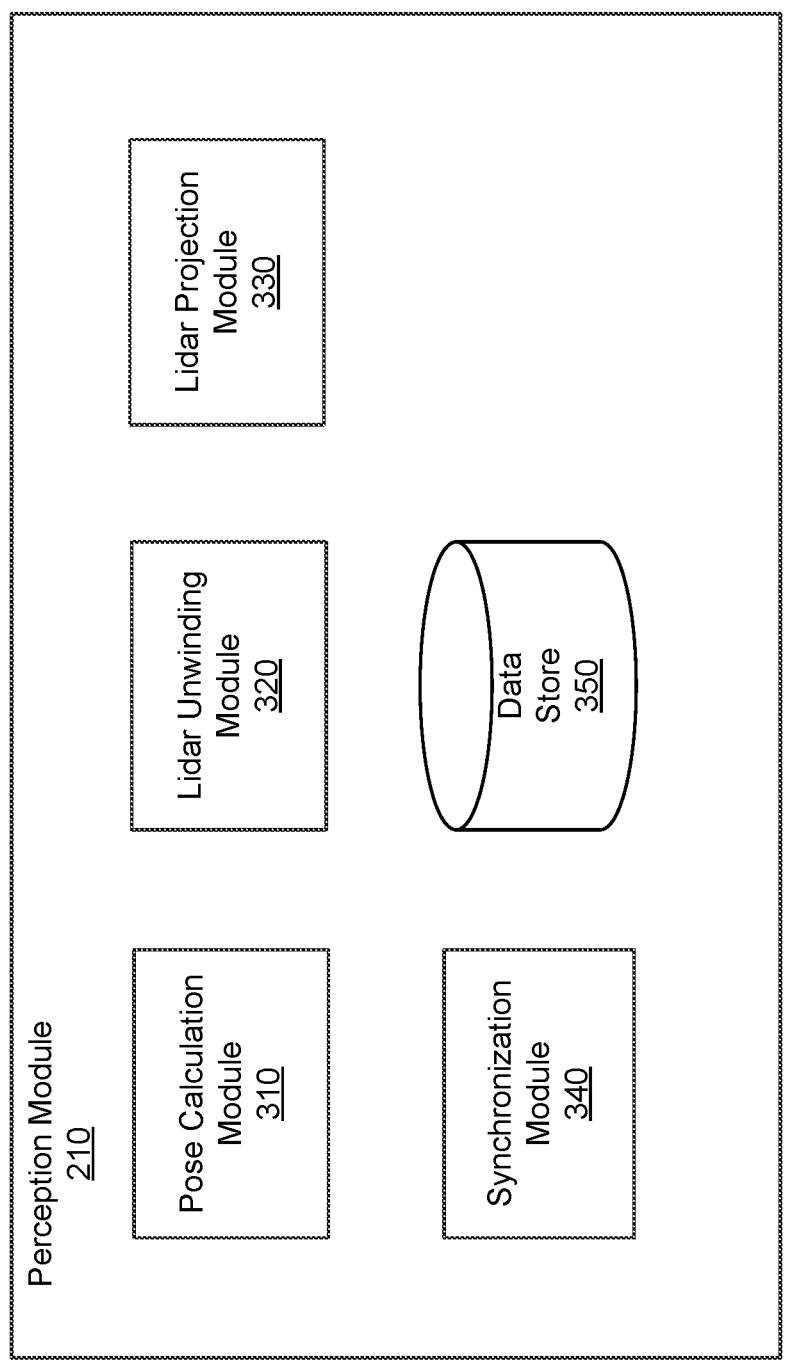
FIG. 3 illustrates the module architecture of a perception module, according to an embodiment.

FIG. 3 illustrates the module architecture of a perception module 210, according to an embodiment. The perception module 210 uses sensor data 230 to contextualize a local area surrounding a vehicle 150. In some embodiments, the sensor data 230 may be collated into track samples along a route, with each track sample includes a lidar scan captured at a lidar timestamp and one or more images captured at a camera timestamp by one or more cameras, wherein the lidar timestamp and the camera timestamp are in temporal proximity. The track sample may additionally contain GPS data and IMU data captured temporally proximal to the lidar scan and/or the images. To contextualize the local area, the perception module 210 combines lidar data with image data captured by one or more cameras to identify various features in the local area. Features in the local area may include one or more objects in the local area, details of the road on which the vehicle 150 is travelling, traffic signs along the road, and so on. The contextualized local area may be used by the vehicle computing system 120 for real-time localization of the vehicle in the HD map or for generating and/or updating the HD map. The perception module 210 has a pose calculation module 310, a lidar unwinding module 320, a lidar projection module 330, a synchronization module 340, and a data store 350, according to an embodiment. In other embodiments, the perception module 210 includes additional or fewer components that those listed herein. Additionally, various functions of the perception module 210 may be variably distributed amongst the components. In alternative embodiments, some or all functions of the perception module 210 may be implemented on components of the HD map system 110.

The pose calculation module 310 determines a pose of the vehicle 150. The pose of the vehicle 150 generally describes a position and an orientation of the vehicle 150 in some reference coordinate system. In order to determine a pose for the vehicle 150, the pose calculation module 310 uses lidar data from the lidar on the vehicle 150. The pose calculation module 310 uses a pair of lidar scans. With the pair of lidar scans, the pose calculation module 310 implements an iterative closest point algorithm (ICP) to initialize a transformation between the pair of lidar scans. The pose calculation module 310 transforms one of the lidar scans to approximate the other. The pose calculation module 310 calculates an error metric based on the transformed lidar scan and the other lidar scan that is defined by a distance between corresponding point clouds in the transformed lidar scan and the other lidar scan. The pose calculation module 310 then iteratively adjusts the transformation to minimize the error metric until under a threshold error.

In other embodiments, the pose calculation module 310 determines a pose of the vehicle 150 with image data from one or more cameras on the vehicle 150. In some embodiments, the pose calculation module 310 uses stereoscopic images captured by a pair of stereoscopic cameras on the vehicle 150. The pose calculation module 310 determines a transform from one of the stereoscopic images to the other. Once determined, the pose calculation module extracts a pose of the vehicle 150 according to the transform. In other embodiments, the pose calculation module 310 determines a pose of the vehicle 150 from video captured by a camera. In yet other embodiments, the pose calculation module 310 determines a pose from a single image captured by a camera on the vehicle 150. The pose calculation module 310 knows a position and an orientation of the camera relative to the vehicle, and based on the image can calculate a pose of the vehicle 150.

The lidar unwinding module 320 unwinds a lidar scan. As a single lidar scan is captured over a lidar exposure, the lidar scan may be subject to lidar motion while the vehicle 150 is in motion during the lidar exposure. To recover the true 3D point cloud of the surrounding environment relative to the lidar's location at a specific timestamp, the perception module 210 compensates for the lidar's motion during the course of scanning the environment. This motion compensation operation is referred to as "unwinding" and the transform applied for unwinding is referred to as the unwinding transform. The unwinding transform shifts different lidar point clouds in the lidar scan to account for the lidar motion. Therefore, embodiments transform the point cloud data using an unwinding transform that compensates for the motion of the lidar and transforms the lidar scan to one that is consistent with the real world.

In one or more embodiments, the lidar unwinding module 320 determines the unwinding transform for the lidar scan. In one embodiment, the lidar unwinding module 320 determines the unwinding transform from consecutive vehicle 150 poses. The lidar unwinding module 320 selects consecutive vehicle 150 poses (e.g., determined by the pose calculation module 310) that temporally bound the lidar exposure for the lidar scan. The lidar unwinding module 320 calculates a total transform between the two consecutive poses. The lidar unwinding module 320 then determines a temporal position of the lidar timestamp and relative to the consecutive poses. Based on the temporal position, the lidar exposure, and the total transform, the lidar unwinding module 320 calculates the unwinding transform for use in unwinding the lidar scan.

The lidar projection module 330 projects a lidar scan onto one or more images. The lidar projection module 330 retrieves the one or more images in the track sample with the lidar scan (e.g., unwound by the lidar unwinding module 320). The lidar scan is recorded by the lidar to have been captured at the lidar timestamp, while the images are recorded by the camera to have been captured at the camera timestamp. The lidar projection module 330 according to a known lidar-Camera transform (e.g., provided by as input or from an external system) converts each point cloud in the lidar scan into image coordinates in the images according to the camera timestamps. Once the lidar projection module 330 determines a corresponding image coordinate to map each lidar point cloud, the lidar projection module 330 generates a lidar projection, wherein the lidar scan is mapped onto the image coordinates. In some embodiments, the lidar-Camera transform also adjusts for rolling shutter correction of the images. In a similar manner to that described above with the lidar motion, the images may be captured over a camera exposure that creates distortions in moving objects when in the camera is in the process of capturing an image by raster scanning a photodiode array. To compensate for the rolling shutter, the lidar-camera transform may include rolling shutter correction. In some embodiments with multiple images, the lidar projection module 330 stitches images together. The lidar projection module 330 may also distinguish intensities of the point clouds in the lidar projection according to reflective intensities recorded by the lidar.

The synchronization module 340 synchronizes the sensors on the vehicle 150. In one embodiment, the synchronization module 340 synchronizes the lidar and the one or more cameras. As each sensor of the vehicle 150 operates with individual clocks, the various clocks are subject to introducing discrepancies amongst one another. To account for potential time drift in timestamps of data collected by the sensors, the synchronization module 340 synchronizes the sensors. In particular, the synchronization module 340 synchronizes the lidar and the one or more cameras such that the lidar projection properly aligns with the images. In addition, the synchronization module 340 may adjust the clocks in one of the lidar and the cameras.

In a first method of synchronizing the lidar and one or more cameras, the synchronization module 340 uses time deltas to compute lidar projections to model time drift between the lidar and the cameras. The synchronization module 340 iterates through a plurality of time deltas to adjust the camera timestamps. The synchronization module 340 then provides the adjusted camera timestamps with the lidar scan and the images to the lidar projection module 330. The synchronization module 340 receives, in return, lidar projections according to the adjusted camera timestamps. The synchronization module 340 determines an alignment score for each of the lidar projections based on alignment to the images. In one embodiment, the synchronization module 340 calculates an alignment edge score of a feature identified in the lidar projection and the images, wherein the alignment score is dependent on the calculated alignment edge score. In another embodiment, the alignment score is provided as input by a reviewer. Based on the alignment scores, the synchronization module 340 selects a time delta as a time shift for the track sample. In some embodiments, the synchronization module 340 selects multiple track samples along a route for modeling the time shift along the route. The first manner of synchronization will be further described in conjunction with FIGS. 5-6.

In a second method of synchronizing the lidar and one or more cameras, the synchronization module 340 iterates through various start times for the cameras to determine a synchronized start time between the cameras and the lidar. According to this second manner, the synchronization module 340 identifies a reflective surface within a threshold distance from the lidar and the cameras and in fields of view of the cameras. The synchronization module 340 instructs the lidar to emit a plurality of light columns against the reflective surface at a lidar frequency. The synchronization module 340 configures the cameras to detect the light columns emitted by the lidar. The synchronization module 340 then instructs start times for the cameras from a plurality of start times. The synchronization module 340 analyzes the image data received from the cameras to calculate an alignment score for each of the many start times. The start time with the optimal alignment score is selected and used for to synchronize the lidar and the cameras. The second manner of synchronization will be further described in conjunction with FIGS. 7, 8A, 8B, and 8C.

The data store 350 stores track samples. The data store 350 may log a record of historical track samples collected by sensors on the vehicle 150. In some cases, the data store 350 receives synchronized track samples as synchronized by the synchronization module 340. The data store 350 may additionally provide the synchronized track samples to other components of the vehicle computing system 120. The data store 350 may additionally store lidar projections superimposed onto the images as part of an origin track sample.

FIG. 4 illustrates a flowchart describing a process 400 of projecting a lidar scan onto an image for use by the navigational system, according to an embodiment. In one or more embodiments, the process 400 may be implemented by components of the perception module 210 of the vehicle computing system 120. In other embodiments, the HD map system 110 executes the process 400. The process 400 may be executed during and/or after navigation of the vehicle 150 on a route.

The perception module 210 obtains 410 a track sample comprising a lidar scan captured at a lidar timestamp, an image captured at a camera timestamp, and consecutive poses inclusive of the duration of the track sample. The lidar scan is captured by a single lidar with the lidar timestamp determined by an internal clock for the lidar. The image may be a single image or a stitched image derived from multiple images. The image is tied to a camera timestamp determined by an internal clock for the camera(s). The camera timestamp may be associated with a start time when capturing the image or a processing time when the captured image data is being stored by the camera. The consecutive poses bound the duration of the track sample. The consecutive poses may be determined by the pose calculation module 310 using lidar data and/or image data to determine a pose of the vehicle 150.

The perception module 210 projects 420 the lidar scan onto the image for the track sample. In order to do so, the perception module 210 computes 422 an unwinding transform with the consecutive processes with similar principles described under the lidar unwinding module 320. The perception module 210 unwinds 424 the lidar scan according to the unwinding transform and the camera timestamp with similar principles described under the lidar unwinding module 320. Based on the unwound lidar scan, the perception module 210 projects 426 the unwound lidar scan onto the image coordinates as a lidar projection with similar principles described under the lidar projection module 330. The perception module 210 may additionally perform steps for synchronizing the track sample such that the lidar projection aligns with the image with similar principles described under the synchronization module 340. The perception module 210 may then store the lidar projection with the track sample for downstream uses.

In some embodiments, the perception module 210 localizes 430 the vehicle 150 with the lidar projection. The perception module 210 uses the lidar projection in tandem with an HD map as stored in the local HD map store 275 to determine a position of the vehicle in the HD map. In other embodiments, the perception module 210 generates or updates 440 the HD map with the lidar projection.

Vehicle Sensor Synchronization

Figure 5:
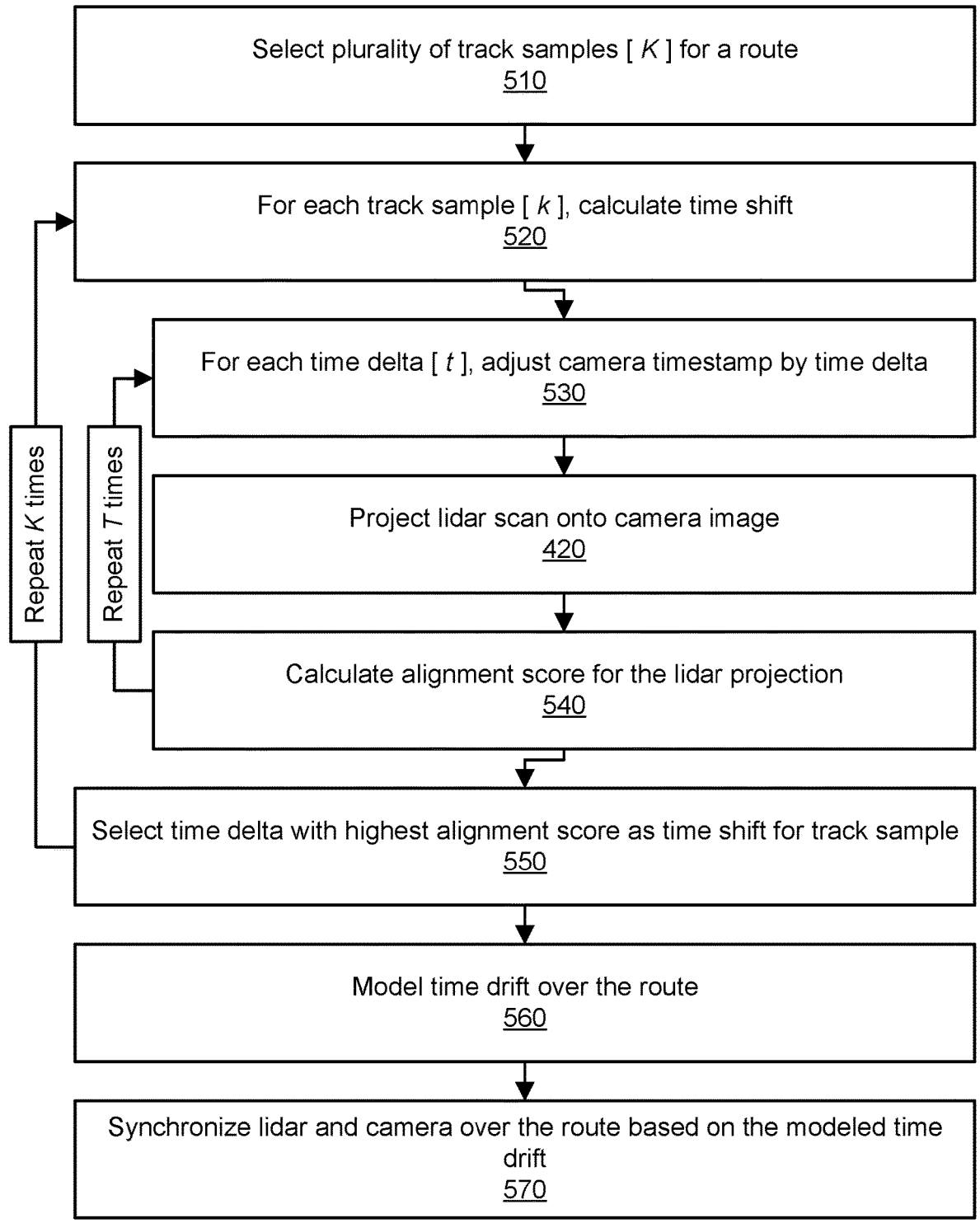
FIG. 5 illustrates a flowchart describing a first method for synchronizing a lidar and a camera on a vehicle, according to an embodiment.

FIG. 5 illustrates a flowchart describing a first method 500 for synchronizing a lidar and a camera on a vehicle, according to an embodiment. The first method 500 may be implemented by the perception module 210 or more specifically the synchronization module 340. According to the first method 500, the perception module 210 may synchronize the lidar and the camera along a route. The route may be specifically chosen for the synchronization or may be a portion of a real-time route of the vehicle 150. In other embodiments, any combination of modules of the HD map system 110 and modules of the vehicle computing system 120 may be used to accomplish the first method 500.

The perception module 210 selects 510 a plurality of track samples [K] for the route. The perception module 210 may first select a route that is substantially straight. The perception module 210 may consider poses of many track samples to determine whether the poses define a route that within a tolerance of curvature. In addition, the perception module 210 may select a route with the vehicle 150 moving above a threshold speed (e.g., 30 miles per hour (mph), 35 mph, 40 mph, 45 mph, 50 mph, 55 mph, and 60 mph). Along the selected route, the perception module 210 selects the plurality of track samples [K]. In some embodiments, the perception module 210 includes a first track sample near a start of the route (e.g., temporally or distance-wise) and a last track sample near an end of the route (e.g., temporally or distance-wise). The perception module 210 may also select additional track samples that are evenly distributed between the first and the last track sample.

In additional embodiments, the perception module 210 selects 510 track samples with specific features identifiable in the lidar scan and/or the images. In one or more embodiments, the perception module 210 parses through the track samples and identifies features present in either the lidar scan or the images. In one example, the perception module 210 identifies highly reflective features in the lidar scan for track samples, e.g., a reflector on a road. The perception module 210 may select such track samples for use in the method 500. In another embodiment, the perception module 210 identifies features substantially flat and perpendicular to a line of sight to the lidar and/or the camera, e.g., a road sign.

For each track sample, the perception module 210 calculates 520 a time shift. In order to calculate a time shift for each sample, the perception module 210 determines a set of time deltas [T] by which to adjust the camera timestamp. The time deltas may be on the order of milliseconds (ms), e.g., 0 ms, 1 ms, 2 ms, 3 ms, 4 ms, 5 ms, 6 ms, 7 ms, 8 ms, 9 ms, 10 ms, 15 ms, 20 ms, 25 ms, 30 ms, etc. Additionally, the time deltas can be positive or negative values effectively adding to the camera timestamp (a later timestamp) or subtracting from the camera timestamp (an earlier timestamp).

To calculate a time shift for a single track sample, the perception module 210 analyzes alignments of the image and lidar projections with adjusted camera timestamps. For each time delta [t] of the time deltas [T], the perception module 210 adjusts the camera timestamp by the time delta. The perception module 210 projects 420 the lidar scan onto the image coordinates according to the adjusted camera timestamp. The projection step 420 implements similar principles as described above in FIG. 4. In one embodiment, the perception module 210 unwinds the lidar scan and projects the unwound lidar scan onto the image coordinates using a lidar-camera transform with inputs of the lidar scan and the adjusted camera timestamp. With the lidar projection at each adjusted camera timestamp and the image, the perception module 210 calculates 540 an alignment score for that lidar projection. Calculation of the alignment score can be accomplished in two manners which will be further described below. Once an alignment score is calculated for a first time delta [t0] in the plurality of time deltas [T], the perception module 210 iterates through the remaining time deltas to calculate an alignment score for each of the time deltas.

A first embodiment obtains input that is used in calculating the alignment score. The perception module 210 superimposes the lidar projection onto the image. Additionally, the perception module 210 visually distinguishes the projected point clouds according to a reflective intensity value as recorded by the lidar. For example, the perception module 210 uses a color spectrum to distinguish point clouds of varying reflective intensity values. For example, a point cloud colored red will be of a higher reflective intensity value compared to a point cloud colored purple of a lower reflective intensity value. The perception module 210 provides the lidar projections superimposed onto the image to a user for manual review. The perception module 210 generates a graphical user interface (GUI) for displaying the lidar projections superimposed onto the image. For example, the GUI may receive input to switch between each of the lidar projections for a track sample. A user of the GUI may view each of the lidar projections and provide inputs which may be used to calculate the alignment score for each of the lidar projections. In some embodiments, the vehicle computing system 120 has an electronic display for displaying the GUI. In these embodiments, the perception module 210 presents the GUI to the electronic display for review by a user in the vehicle 150. The user may provide an input for each lidar projection. The perception module 210 may receive each input corresponding to an alignment score. For example, the GUI also presents a slider for allowing the user to provide input through the slider. One side of the slider may correspond to maximal alignment of the lidar projection with the opposite side corresponding to minimal alignment. In other embodiments, the HD map system 110 has an electronic display or is connected to an external system with an electronic display. In these embodiments, the HD map system 110 receives the GUI from the perception module 210 and also receives the input that is transmitted to the perception module 210.

Another embodiment calculates alignment scores for lidar projections based on identifiable features. The perception module 210 identifies one or more informative features in both the lidar projection and the image. The perception module 210 identifies an informative feature in the lidar projection by first determining point clouds in a ground plane of the lidar projection. The perception module 210 may fit a ground plane in the lidar projection using Random Sample Consensus (RANSAC). Within the point clouds in the fitted ground plane, the perception module 210 identifies highly reflective features based on reflective intensity values of the point clouds. Reflectors on the road are highly reflective objects that would provide large reflective intensity values in the point clouds. The perception module 210 may group point clouds with high reflective intensity values in close proximity to one another as the identified informative feature. In addition, the perception module 210 calculates a lidar edge score based on a differential of a lidar point cloud's reflective intensity value compared to reflective intensity values of adjacent point clouds in a lidar scan line. Lidar point clouds with a higher lidar edge score would correspond to lidar point clouds closer to edges of features detected in the lidar scan.

Additionally, the perception module 210 identifies the same informative feature from the lidar projection in the image. The perception module 210 may convert the pixels in the image to intensity values (e.g., in grayscale). The perception module 210 then calculates an image edge score for each pixel as a gradient strength by taking a differential of that pixel's intensity value with intensity values of neighboring pixels. The gradient strength of the pixels may be used by the perception module 210 to outline features in the image. The perception module 210 may further identify portions of the image, e.g., a first portion relating to the road and a second portion relating to the sky. The perception module 210 then identifies pixels of the informative feature. One way to do so involves searching for features in proximity to the identified feature in the lidar projection. Another way to do so involves searching in portions of the image that would correspond to the desired feature, e.g., looking to the first portion relating to the road to identify pixels relating to a reflector. With the identified pixels for a feature, the perception module 210 defines a shape of the informative feature in the image. The perception module 210, in a similar manner to identifying the informative feature in the lidar projection, may determine whether the shape of the informative feature is approximate to a selected shape. For example, the perception module 210 searches for identified features that fit a rectangular shape. The perception module 210 may, consequently, disregard features that do not fit the shape.

Once the informative feature is identified in the lidar projection and the image, the perception module 210 may calculate an alignment score for the lidar projection. The perception module 210 superimposes the informative feature in the lidar projection onto the image. Since the lidar projection and the image use the image coordinates, the perception module 210 can compare the alignment of the lidar projection and the image. The perception module 210 calculates an alignment edge score by comparing the lidar edge scores of the point clouds associated with the informative feature in the lidar projection to the image edge scores of the pixels associated with the same informative feature identified in the image. The perception module 210 calculates, for each image coordinate, an edge score as a product of the lidar edge score of the point cloud in the lidar projection and the image edge score of the pixel in the image. The perception module 210 may then define the alignment score of the lidar projection according to the alignment edge scores. In one embodiment, the perception module 210 defines the alignment score as a sum of the alignment edge scores. In some examples, a higher alignment score, therefore, refers to better alignment between the lidar projection and the image compared to a lower alignment score.

The perception module 210 selects 550 a time delta with the highest alignment score as the time shift for the track sample. Once all time deltas are iterated through producing an alignment score of the lidar projection compared to the image, the perception module 210 selects 550 the time delta with the highest alignment score as the time shift for the track sample, an example of this selection will be discussed in conjunction with FIG. 6. Once the perception module 210 calculates a time shift for a first track sample [k0], the perception module 210 iterates through the remaining track samples to calculate a time shift for each of the track samples [K].

With the calculated time shifts of the track samples, the perception module 210 models 560 the time drift between the lidar and the camera over the route. The perception module 210 may model 560 the time drift by plotting the time shift of each track sample over the plurality of track samples [K] selected in the route. In one embodiment, the perception module 210 may connect adjacent time shifts providing interpolating ability. In other embodiments, perception module 210 may rather linearly regress the time shifts. In alternative embodiments, the perception module 210 may rather regress the time shifts according to other techniques—e.g., polynomial regressions, logistic regressions, other regression algorithms, etc.

The perception module 210 synchronizes 570 the lidar and the camera over the route based on the modeled time drift. The perception module 210 adjusts either the lidar timestamp or the camera timestamp for each of the track samples [K] based on the calculated time shift. For other track samples not selected in step 510, the perception module 210 predicts a time shift according to the modeled time drift. With track samples between the first track sample and the last track sample selected, the perception module 210 may use the modeled time drift to interpolate a predicted time shift. With track samples outside of the first and the last track sample, the perception module 210 may use the modeled time drift to extrapolate a predicted time shift. The interpolation/extrapolation can be linear or non-linear (e.g., by fitting a polynomial). In addition, the perception module 210 may adjust either the lidar internal clock or the camera internal clock to synchronize the two clocks for subsequent collection of lidar scans and images. According to this first method of synchronizing the lidar and the camera, the perception module 210 is able to achieve a precision on the order of milliseconds, e.g., 1 ms, 2 ms, 3 ms, 4 ms, 5 ms, 6 ms, 7 ms, 8 ms, 9 ms, or 10 ms.

Figure 6:
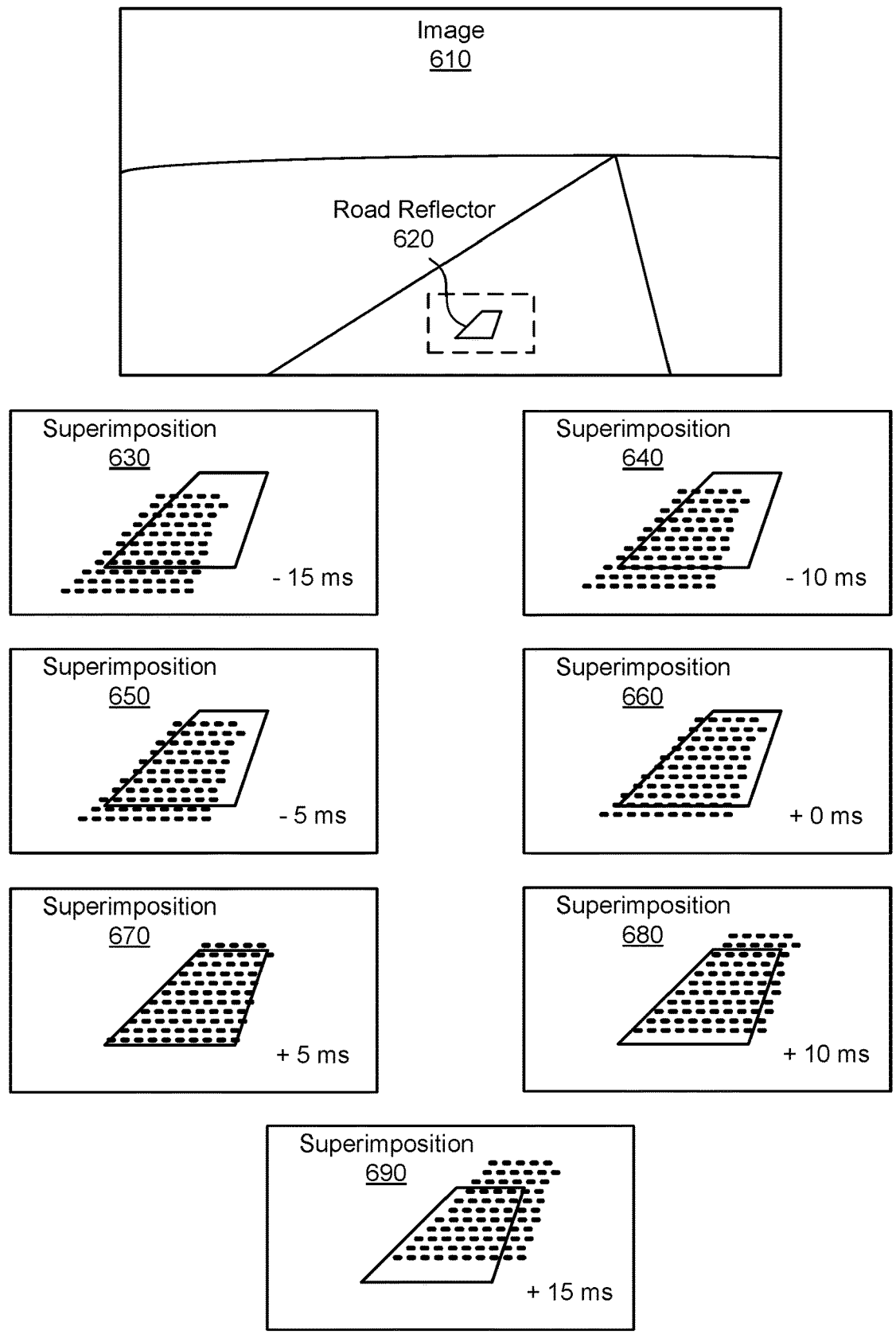
FIG. 6 demonstrates the first method for synchronizing the lidar and the camera, according to an embodiment.

FIG. 6 demonstrates the first method for synchronizing the lidar and the camera, according to an embodiment. The perception module 210 accomplishes the first method 500 for synchronizing the lidar and the camera. In this illustrative example, the perception module 210 is calculating 520 a time shift for a track sample. The track sample 610 includes the image 610 with an identified informative feature—i.e. the road reflector 620. In order to calculate the time shift, the perception module 210 calculates an alignment score for a plurality of lidar projections In this example, the time deltas used for adjustment of the camera timestamp include −15 ms, −10 ms, −5 ms, 0 ms, +5 ms, +10 ms, and +15 ms.

With the identified informative feature in both the lidar projection and the image, the perception module 210 calculates an alignment score for each time delta. The lidar projection is superimposed onto the image as superimpositions 630, 640, 650, 660, 670, 680, and 690 corresponding to time deltas −15 ms, −10 ms, −5 ms, 0 ms, +5 ms, +10 ms, and +15 ms, respectively.

According to the first manner for calculating an alignment score, the superimpositions are provided to a user through a graphical user interface. In this first manner, the superimpositions may include not just the identified feature but the entire lidar projection superimposed onto the image. The user may provide input for each of the superimpositions or may simply select the superimposition with the closest alignment. In this illustrative example, the user may review the set of superimpositions and may end up selecting time delta +5 ms as the one with optimal alignment. The perception module 210 receives the input and may determine the time shift for the track sample to be +5 ms.

According to the second manner for calculating an alignment score, the superimpositions are scored by the perception module 210. The perception module 210 identifies the informative feature in both the lidar projection and the image. Once identified, the perception module 210 may further determine a lidar outline of the informative feature in the lidar projection and an image outline in the image. The perception module 210 calculates an edge score according to the outlines. The perception module 210 then calculates the alignment score according to the calculated edge scores. In this example, the perception module 210 may calculate an alignment score out of 100 for each of the superimpositions. Noticeably, superimpositions 630, 640, 650, and 690 are quite off. Superimpositions 660 and 680 are closer yet, but superimposition 670 has the optimal alignment. In superimposition 670, the perception module 210 may calculate an edge score that is the lowest amongst the set. The superimposition 670 has overall a lowest distance between paired point clouds and image pixels compared to others in the set.

Figure 7:
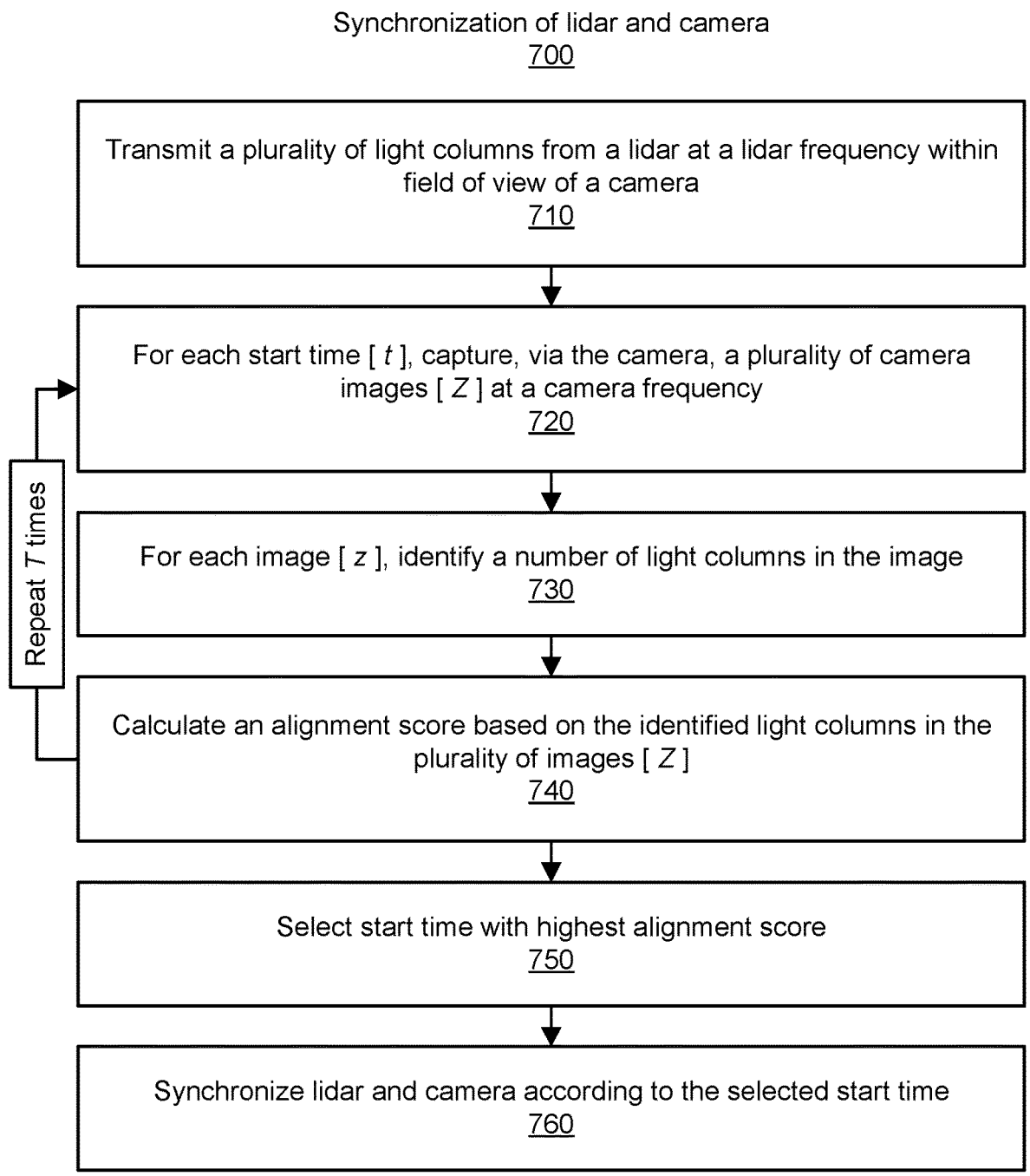
FIG. 7 illustrates a flowchart describing a second method for synchronizing a lidar and a camera on a vehicle, according to an embodiment.

FIG. 7 illustrates a flowchart describing a second method 700 for synchronizing a lidar and a camera on a vehicle, according to an embodiment. The second method 700 may be implemented by the perception module 210 or more specifically the synchronization module 340. According to the second method 700, the perception module 210 may synchronize the lidar and the camera at a stopped position along a route. The second method 700 relies on using the camera to detect transmitted light columns from the lidar.

Figure 8A:
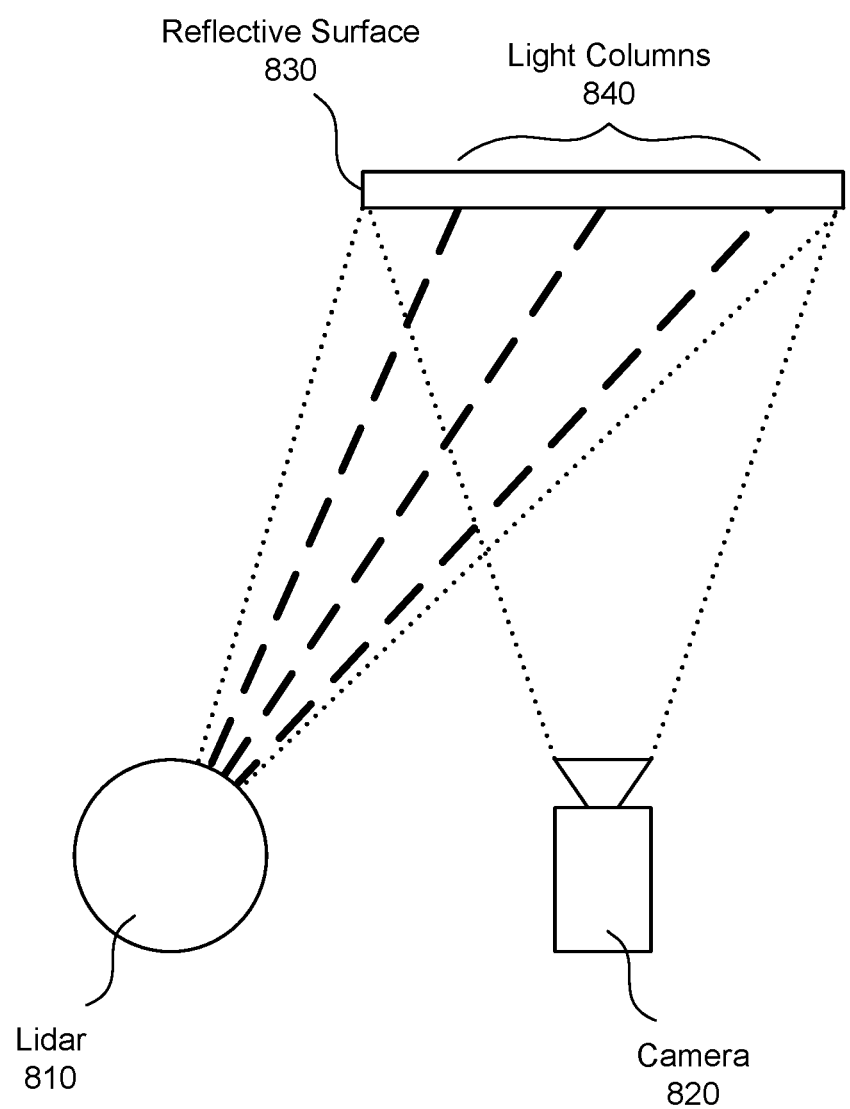
FIG. 8A illustrates a placement configuration of the lidar and the camera for the second method for synchronizing the lidar and the camera, according to an embodiment.

Reference now is made to FIG. 8A; FIG. 8A illustrates a placement configuration of the lidar and the camera for the second method 700 for synchronizing the lidar and the camera, according to an embodiment. For the second method 700, a reflective surface 830 is placed in a field of view of a lidar 810 and a camera 820. The reflective surface is substantially reflective such that transmitted light columns 840 on the reflective surface 830 may be detected and imaged by the camera 820. For this second method 700, the camera is configured to detect wavelengths of light emitted by the lidar, e.g. infrared light. In one or more embodiments, the perception module 210 analyzes an image from the camera to determine whether the reflective surface 830 is substantially wide to be incident with some number of light columns, e.g., 2, 3, 4, 5, 6, 7, 8, 9, or 10 light columns. In additional embodiments, the perception module 210 analyzes a lidar scan to determine whether the reflective surface 830 is within a threshold distance from the lidar 810 and the camera 820, e.g., within 1, 2, 3, 4, or 5 meters. In one example, a viable reflective surface for use in this second method 700 is a white matte board that is wide enough to at least capture 3 light columns transmitted by the lidar 810.

Now referring back to the second method 700, the perception module 210 instructs the lidar to transmit 710 a plurality of light columns at a lidar frequency within a field of view of the camera onto a reflective surface. The lidar frequency describes a frequency at which the lidar transmits light columns for a lidar scan, e.g., 10 Hz.

The perception module 210 then determines a plurality of start times [T] and instructs the camera to capture 720 a plurality of images [Z] at a camera frequency from each of the start times [T]. Each of the images is captured over an exposure time, e.g., 5 ms or at a shutter speed of $\frac{1}{200}$ seconds. The perception module 210 may determine the plurality of start times [T] based on the lidar frequency, the camera frequency, and the camera exposure time. In one embodiment, the perception module 210 determines to use some number of start times based on a ratio of the camera exposure time and the camera frequency. For example, the camera frequency may be 30 Hz with the exposure time being 5 ms (200 Hz) such that the ratio would be ~6.67. Accordingly, the perception module 210 determines that at least 7 start times are needed that are 5 ms apart: 0 ms, 5 ms, 10 ms, 15 ms, 20 ms, 25 ms, and 30 ms. In another embodiment, the perception module 210 may determine start times with some overlap of exposure time, e.g., 0 ms, 4 ms, 8 ms, etc. In some embodiments, the number of images [Z] captured by the camera for each start time is determined by a ratio of the camera frequency and the lidar frequency. For example, the camera frequency is 30 Hz and the lidar frequency is 10 Hz such that the ratio would be 3. Accordingly, the perception module 210 instructs the camera to capture 3 images for each start time.

Once the images are captured for a start time, the perception module 210 identifies 730 one or more light columns in each image. The perception module 210 identifies 210 the light columns through the following process. In some embodiments, the camera is instructed by the perception module 210 to apply an infrared filter. After having applied the infrared filter, the perception module 210 transforms each pixel in the image to an intensity value (e.g., in grayscale). The intensity value of a pixel corresponds directly to an amount of infrared light detected by the camera at that pixel. The perception module 210 calculates a gradient strength for each pixel based on the intensity value of that pixel and its neighboring pixels. Based on the calculated gradient strengths, the perception module 210 identifies pixels above a threshold gradient strength. The perception module 210 may further group pixels outlining light columns captured by the image from which to count a number of columns in the image.

The perception module 210 calculates 740 an alignment score for each start time based on the identified columns in the images. The perception module 210 counts the number of identified columns in the images for a start time. The perception module 210 computes the alignment score according to the count. For example, for a start time with three images, there is only light column visible in only one of the images with the other images having no light columns. The perception module 210 may determine the count to be the alignment score or may average the count to be the alignment score.

The perception module 210 selects 750 a start time with the highest alignment score. The perception module 210 may rank the start times based on the alignments scores and based on the ranking select the highest start time with the highest alignment score. In additional embodiments, the perception module 210 may further select the image in the start time that had the highest number of identified light columns.

The perception module 210 synchronizes 760 the lidar and the camera based on the selected start time. In one or more embodiments, the perception module 210 adjusts either the lidar clock or the camera clock according to the selected start time. For example, the perception module 210 adjusts the camera clock to start the camera at the selected start time. In some embodiments, the perception module 210 rather adjusts either the lidar clock or the camera clock according to the selected image in the selected start time. For example, a start time of 8 ms with each subsequent image captured at 30 Hz has the second image having the most number of identified columns. The perception module may determine to adjust the camera clock to start capturing images at 41 ms which is a sum of 8 ms start time with the second image starting 33.33 ms after the first image. The precision of the second method 700 is dependent on how the camera can be aligned to the lidar frequency—e.g., 5 Hz, 10 Hz, or 20 Hz. The precision may also be dependent on start time precision of the camera—e.g., 30 microseconds (μB). Due to this, the second method 700 may have a synchronization precision on the order of tens of microseconds, e.g., 20 μs, 25 μs, 30 μs, 35 μs, 40 μs, 45 μs, 50 μs, 60 μs, 70 μs, 80 μs, 90 μs, 100 μs, etc. For example, if the lidar frequency is 10 Hz—i.e. every 100 ms the lidar emits light columns on the reflective surface, the camera's precision of triggering start times as 30 μs would result in a synchronization precision of 30 μs.

Figure 8B:
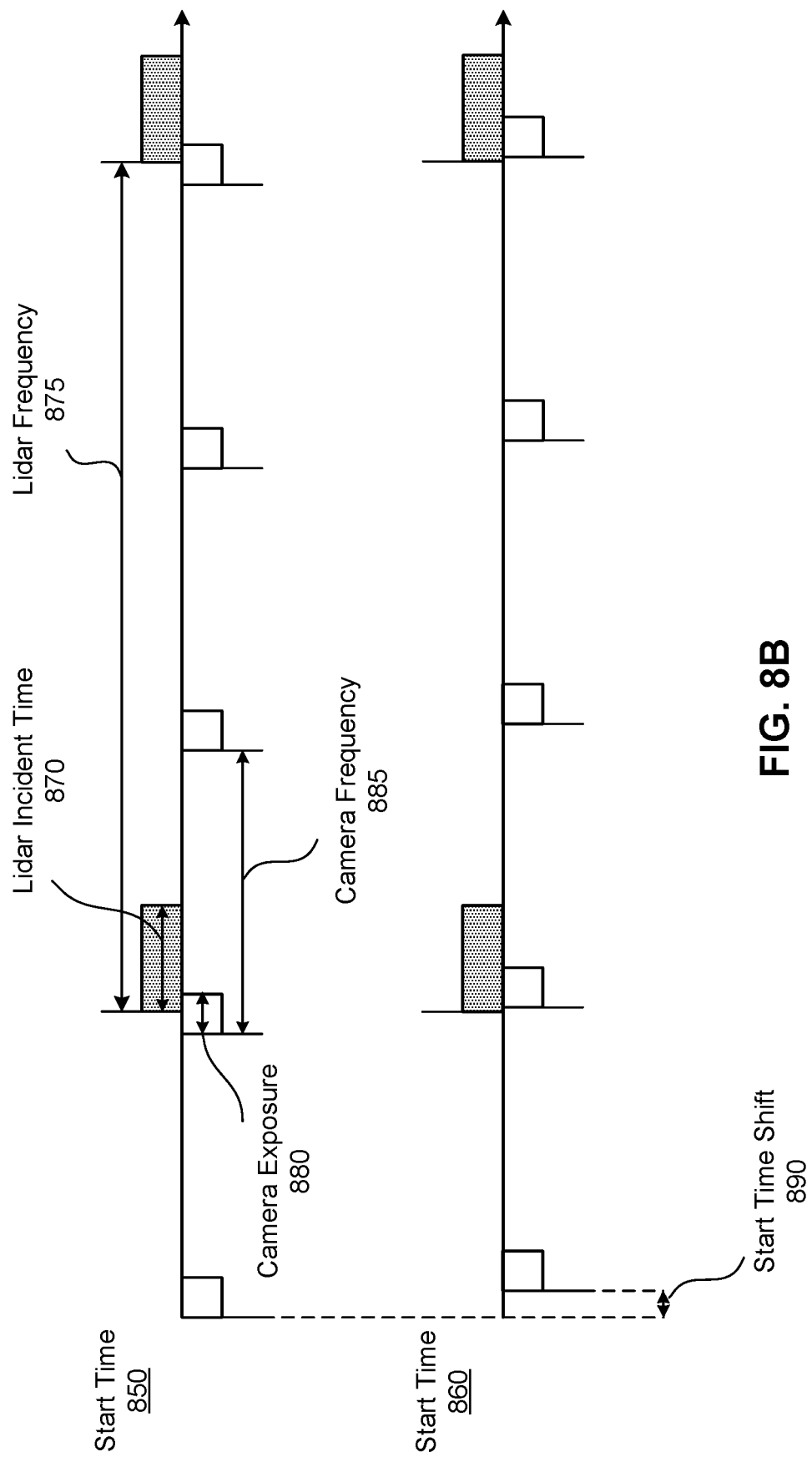
FIGS. 8B & 8C demonstrates the second method for synchronizing the lidar and the camera, according to an embodiment.
Figure 8C:
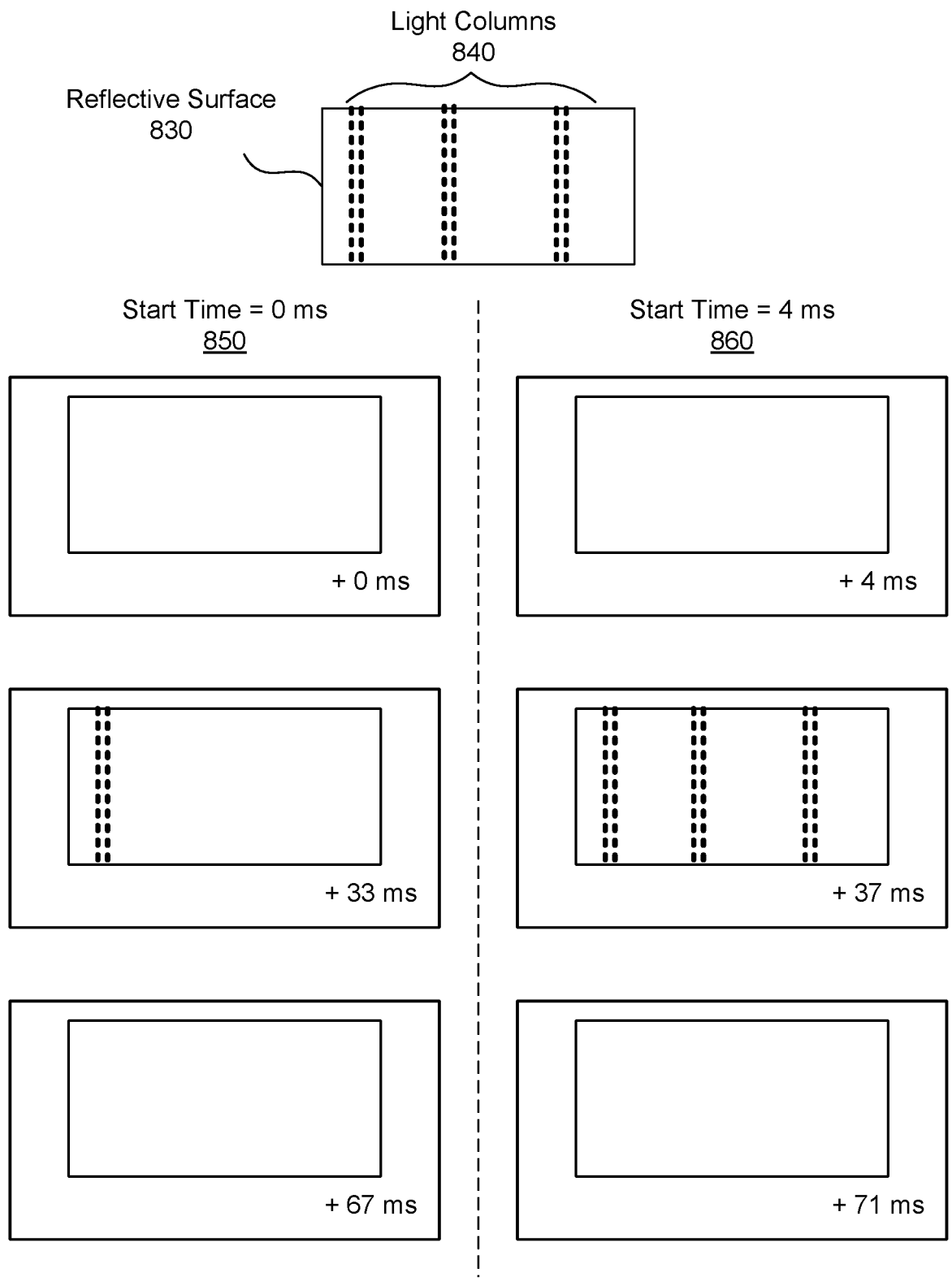

FIGS. 8B & 8C demonstrates the second method 700 for synchronizing the lidar 810 and the camera 820, according to an embodiment. The lidar 810 and the camera 820 are placed in according to the placement configuration shown in FIG. 8A. FIG. 8B shows a timeline demonstrating the second method 700, and FIG. 8C illustrates example images of light columns captured by the camera 820. Discussion of FIGS. 8B & 8C will simultaneously reference both figures.

FIG. 8B illustrates two timelines for two start times 850 and 860 for capturing images by the camera 820. The top of each timeline shows a block of time—a lidar incident time 870—when the light columns 840 transmitted by the lidar 810 is incident on the reflective surface 830. The lidar 810 transmits at a lidar frequency 875 which is denoted by a temporal distance between the moments each lidar incident time 870 begins to transmit light columns 840 onto the reflective surface 830. A camera exposure 880 is a duration of time when the camera 820 is capturing an image—may also be referred to as the shutter speed of the camera 820. A camera frequency 885 is a frequency at which the camera 820 is capturing images. The goal of synchronizing the lidar 810 and the camera 820 may be visually represented by seeking to temporally coincide the lidar incident time 870 and the camera exposure 880. In FIG. 8C, the image that captures the light columns 840 incident on the reflective surface 830 within the exposure time 880 displays all of the three light columns in light columns 840. Between a first start time 850 and a second start time 860 is a start time shift 890.

In the first timeline for start time 850, the camera 820 begins to capture images at 0 ms. The first captured image for the start time 850 of 0 ms and the third image does not capture any of the light columns 840. As shown in FIG. 8C, the first image of the start time 850 at 0 ms and the third image at 67 ms have no light columns captured. In FIG. 8B, there is a partial overlap between the camera exposure 880 and the lidar incident time 870 in the start time 850 at the second captured image. In FIG. 8C, the second image of the start time 850 at 33 ms captures a first column of the light columns 840. The perception module 210 may score the start time 850 according to the one identified one light column in the second image, e.g., an alignment score of 1.

In the second timeline for start time 860, the camera 820 begins to capture images at 4 ms wherein the start time shift 890 is 4 ms between start time 850 and start time 860. Similar to start time 850, a first and a third image for start time 860 do not temporally coincide with the lidar incident time 870. As seen in FIG. 8C, the first image at 4 ms and the third image at 71 ms do not show any captured light columns. However, a second image for start time 860 has an exposure time 880 that completely overlaps with the lidar incident time 870. As seen in FIG. 8C, the second image at 37 ms has captured all three light columns in the light columns 840. The perception module 210 may score the start time 860 according to the three identified light columns in the second image, e.g., an alignment score of 3.

The perception module 210 selects 750 start time 860 with the highest alignment score—i.e. between start time 850 and start time 860. The perception module 210 adjusts the camera to start at 37 ms such that there is complete overlap between the camera exposure time 880 and the lidar incident time 870.

HD Map System Architecture

FIG. 10 shows the system architecture of an HD map system, according to an embodiment. The HD map system 110 comprises a map creation module 1010, a map update module 1020, a map data encoding module 1030, a load balancing module 1040, a map accuracy management module, a vehicle interface module, and a HD map store 165. Other embodiments of HD map system 110 may include more or fewer modules than shown in FIG. 10. Functionality indicated as being performed by a particular module may be implemented by other modules. In an embodiment, the HD map system 110 may be a distributed system comprising a plurality of processors.

The map creation module 1010 creates the map from map data collected from several vehicles that are driving along various routes. The map update module 1020 updates previously computed map data by receiving more recent information from vehicles that recently traveled along routes on which map information changed. For example, if certain road signs have changed or lane information has changed as a result of construction in a region, the map update module 1020 updates the maps accordingly. The map data encoding module 1030 encodes map data to be able to store the data efficiently as well as send the required map data to vehicles 150 efficiently. The load balancing module 1040 balances load across vehicles to ensure that requests to receive data from vehicles are uniformly distributed across different vehicles. The map accuracy management module 1050 maintains high accuracy of the map data using various techniques even though the information received from individual vehicles may not have high accuracy.

High Definition (HD) Map

Figure 11:
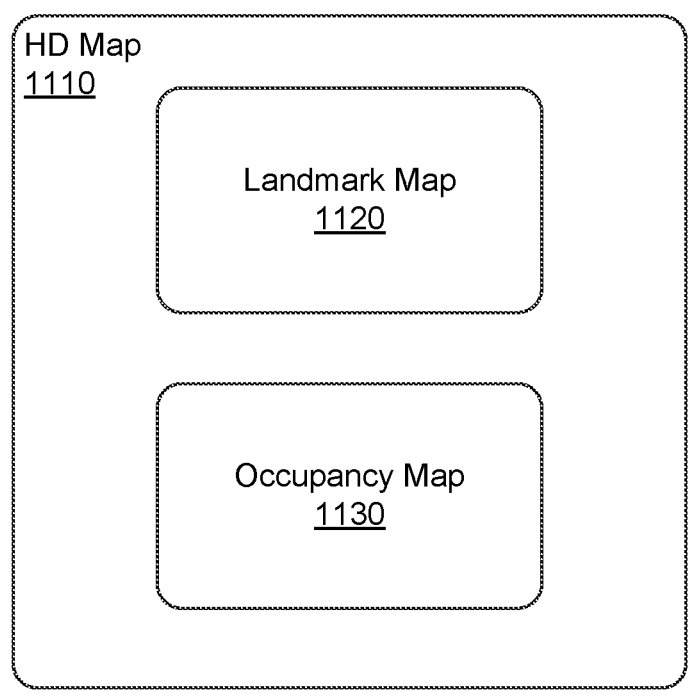
FIG. 11 illustrates the components of an HD map, according to an embodiment.

FIG. 11 illustrates the components of a high definition (HD) map, according to an embodiment. The HD map comprises maps of several geographical regions. The HD map 1110 of a geographical region comprises a landmark map (LMap) 1120 and an occupancy map (OMap) 1130. The landmark map comprises information describing lanes including spatial location of lanes and semantic information about each lane. The spatial location of a lane comprises the geometric location in latitude, longitude and elevation at high prevision, for example, at or below 10 cm precision. The semantic information of a lane comprises restrictions such as direction, speed, type of lane (for example, a lane for going straight, a left turn lane, a right turn lane, an exit lane, and the like), restriction on crossing to the left, connectivity to other lanes and so on. The landmark map may further comprise information describing stop lines, yield lines, spatial location of cross walks, safely navigable space, spatial location of speed bumps, curb, and road signs comprising spatial location and type of all signage that is relevant to driving restrictions. Examples of road signs described in an HD map include stop signs, traffic lights, speed limits, one-way, do-not-enter, yield (vehicle, pedestrian, animal), and so on.

The occupancy map 1130 comprises spatial 3-dimensional (3D) representation of the road and all physical objects around the road. The data stored in an occupancy map 1130 is also referred to herein as occupancy grid data. The 3D representation may be associated with a confidence score indicative of a likelihood of the object existing at the location. The occupancy map 1130 may be represented in a number of other ways. In one embodiment, the occupancy map 1130 is represented as a 3D mesh geometry (collection of triangles) which covers the surfaces. In another embodiment, the occupancy map 1130 is represented as a collection of 3D points which cover the surfaces. In another embodiment, the occupancy map 1130 is represented using a 3D volumetric grid of cells at 5-10 cm resolution. Each cell indicates whether or not a surface exists at that cell, and if the surface exists, a direction along which the surface is oriented.

The occupancy map 1130 may take a large amount of storage space compared to a landmark map 1120. For example, data of 1 GB/Mile may be used by an occupancy map 1130, resulting in the map of the United States (including 4 million miles of road) occupying 4×1015 bytes or 4 petabytes. Therefore the HD map system 110 and the vehicle computing system 120 use data compression techniques for being able to store and transfer map data thereby reducing storage and transmission costs. Accordingly, the techniques disclosed herein make self-driving of autonomous vehicles possible.

In one embodiment, the HD Map does not require or rely on data typically included in maps, such as addresses, road names, ability to geo-code an address, and ability to compute routes between place names or addresses. The vehicle computing system 120 or the HD map system 110 accesses other map systems, for example, GOOGLE MAPs to obtain this information. Accordingly, a vehicle computing system 120 or the HD map system 110 receives navigation instructions from a tool such as GOOGLE MAPs into a route and converts the information to a route based on the HD map information.

Geographical Regions in HD Maps

The HD map system 110 divides a large physical area into geographical regions and stores a representation of each geographical region. Each geographical region represents a contiguous area bounded by a geometric shape, for example, a rectangle or square. In an embodiment, the HD map system 110 divides a physical area into geographical regions of the same size independent of the amount of data required to store the representation of each geographical region. In another embodiment, the HD map system 110 divides a physical area into geographical regions of different sizes, where the size of each geographical region is determined based on the amount of information needed for representing the geographical region. For example, a geographical region representing a densely populated area with a large number of streets represents a smaller physical area compared to a geographical region representing sparsely populated area with very few streets. Accordingly, in this embodiment, the HD map system 110 determines the size of a geographical region based on an estimate of an amount of information required to store the various elements of the physical area relevant for an HD map.

In an embodiment, the HD map system 110 represents a geographic region using an object or a data record that comprises various attributes including, a unique identifier for the geographical region, a unique name for the geographical region, description of the boundary of the geographical region, for example, using a bounding box of latitude and longitude coordinates, and a collection of landmark features and occupancy grid data.

Figure 12B:
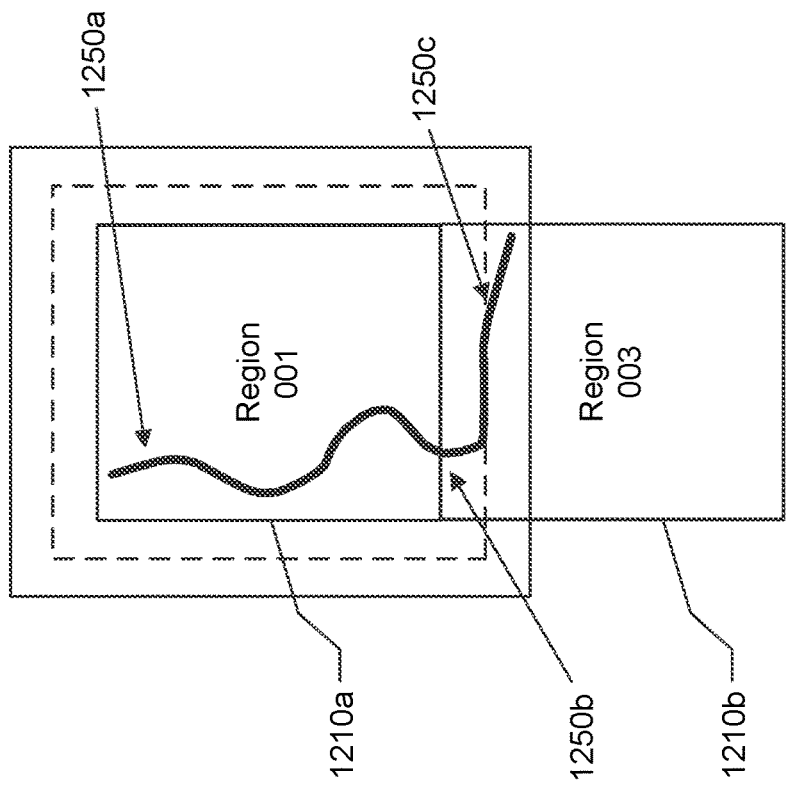
FIGS. 12A & 12B illustrate geographical regions defined in an HD map, according to an embodiment.
Figure 12A:
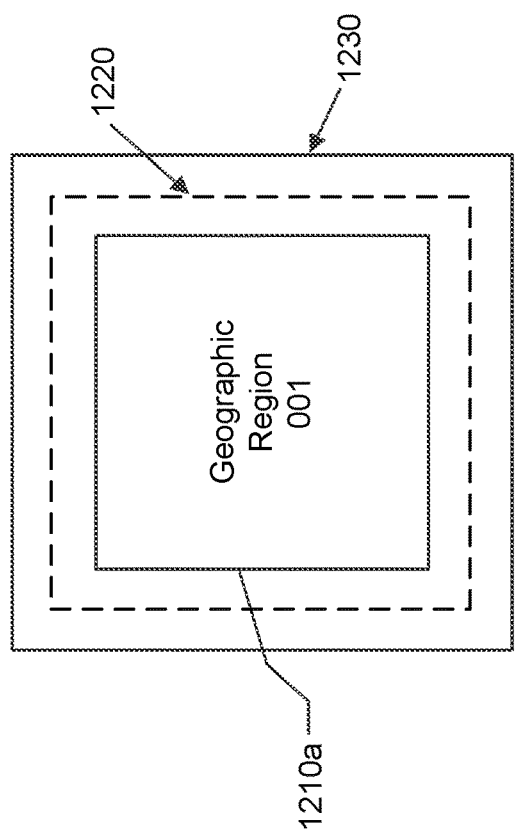

FIGS. 12A-B illustrate geographical regions defined in an HD map, according to an embodiment. FIG. 12A shows a square geographical region 1210*a*. FIG. 12B shows two neighboring geographical regions 1210*a* and 1210*b*. The HD map system 110 stores data in a representation of a geographical region that allows for smooth transition from one geographical region to another as a vehicle drives across geographical region boundaries.

According to an embodiment, as illustrated in FIG. 12, each geographic region has a buffer of a predetermined width around it. The buffer comprises redundant map data around all 4 sides of a geographic region (in the case that the geographic region is bounded by a rectangle). FIG. 12A shows a boundary 1220 for a buffer of 50 meters around the geographic region 1210*a* and a boundary 1230 for buffer of 100 meters around the geographic region 1210*a*. The vehicle computing system 120 switches the current geographical region of a vehicle from one geographical region to the neighboring geographical region when the vehicle crosses a threshold distance within this buffer. For example, as shown in FIG. 12B, a vehicle starts at location 1250*a* in the geographical region 1210*a*. The vehicle traverses along a route to reach a location 1250*b* where it cross the boundary of the geographical region 1210 but stays within the boundary 1220 of the buffer. Accordingly, the vehicle computing system 120 continues to use the geographical region 1210*a* as the current geographical region of the vehicle. Once the vehicle crosses the boundary 1220 of the buffer at location 1250*c*, the vehicle computing system 120 switches the current geographical region of the vehicle to geographical region 1210*b* from 1210*a*. The use of a buffer prevents rapid switching of the current geographical region of a vehicle as a result of the vehicle travelling along a route that closely tracks a boundary of a geographical region.

Lane Representations in HD Maps

The HD map system 110 represents lane information of streets in HD maps. Although the embodiments described herein refer to streets, the techniques are applicable to highways, alleys, avenues, boulevards, or any other path on which vehicles can travel. The HD map system 110 uses lanes as a reference frame for purposes of routing and for localization of a vehicle. The lanes represented by the HD map system 110 include lanes that are explicitly marked, for example, white and yellow striped lanes, lanes that are implicit, for example, on a country road with no lines or curbs but two directions of travel, and implicit paths that act as lanes, for example, the path that a turning car makes when entering a lane from another lane. The HD map system 110 also stores information relative to lanes, for example, landmark features such as road signs and traffic lights relative to the lanes, occupancy grids relative to the lanes for obstacle detection, and navigable spaces relative to the lanes so the vehicle can efficiently plan/react in emergencies when the vehicle must make an unplanned move out of the lane. Accordingly, the HD map system 110 stores a representation of a network of lanes to allow a vehicle to plan a legal path between a source and a destination and to add a frame of reference for real time sensing and control of the vehicle. The HD map system 110 stores information and provides APIs that allow a vehicle to determine the lane that the vehicle is currently in, the precise vehicle location relative to the lane geometry, and all relevant features/data relative to the lane and adjoining and connected lanes.

Figure 13:
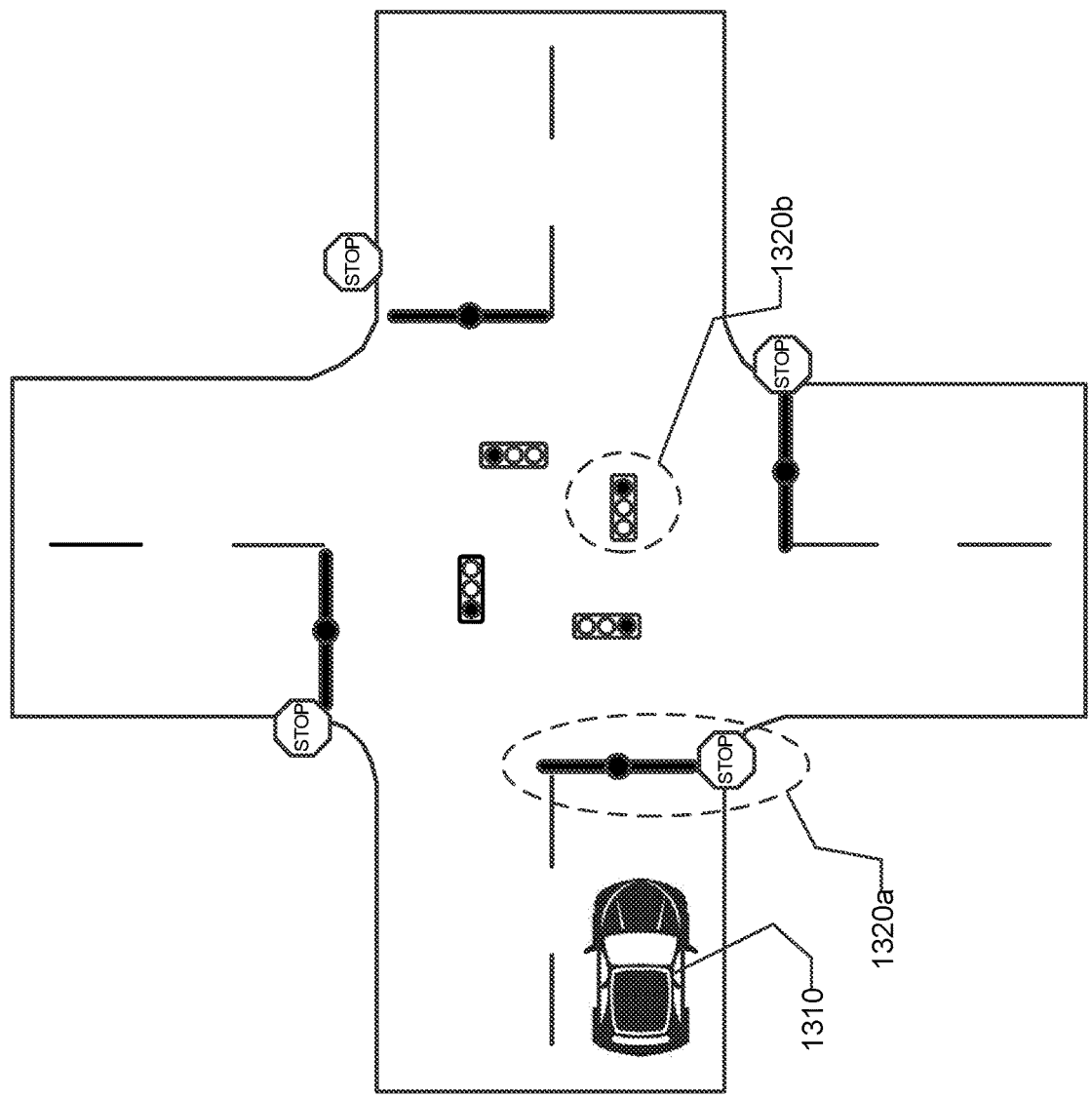
FIG. 13 illustrates representations of lanes in an HD map, according to an embodiment.

FIG. 13 illustrates lane representations in an HD map, according to an embodiment. FIG. 13 shows a vehicle 1310 at a traffic intersection. The HD map system provides the vehicle with access to the map data that is relevant for autonomous driving of the vehicle. This includes, for example, features 1320a and 1320b that are associated with the lane but may not be the closest features to the vehicle. Therefore, the HD map system 110 stores a lane-centric representation of data that represents the relationship of the lane to the feature so that the vehicle can efficiently extract the features given a lane.

The HD map system 110 represents portions of the lanes as lane elements. A lane element specifies the boundaries of the lane and various constraints including the legal direction in which a vehicle can travel within the lane element, the speed with which the vehicle can drive within the lane element, whether the lane element is for left turn only, or right turn only, and so on. The HD map system 110 represents a lane element as a continuous geometric portion of a single vehicle lane. The HD map system 110 stores objects or data structures representing lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and so on.

Examples of lane elements represented by the HD map system 110 include, a piece of a right lane on a freeway, a piece of a lane on a road, a left turn lane, the turn from a left turn lane into another lane, a merge lane from an on-ramp an exit lane on an off-ramp, and a driveway. The HD map system 110 represents a one lane road using two lane elements, one for each direction. The HD map system 110 represents median turn lanes that are shared similar to a one-lane road.

Figure 14A:
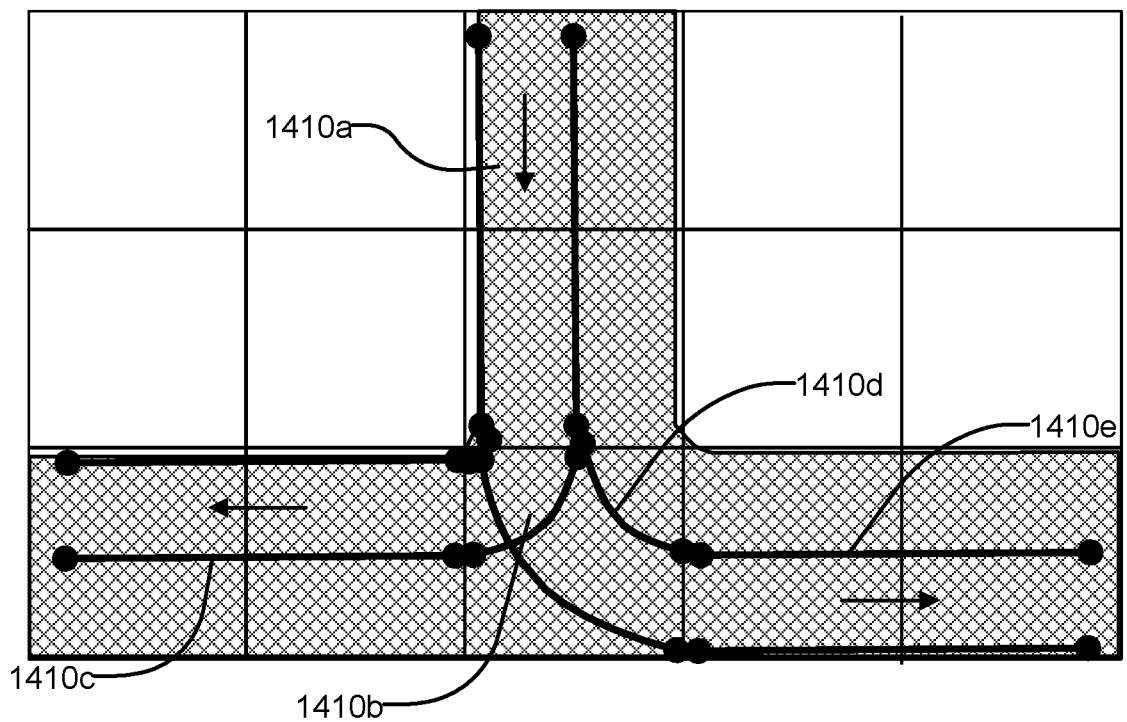
FIGS. 14A & 14B illustrate lane elements and relations between lane elements in an HD map, according to an embodiment.
Figure 14B:
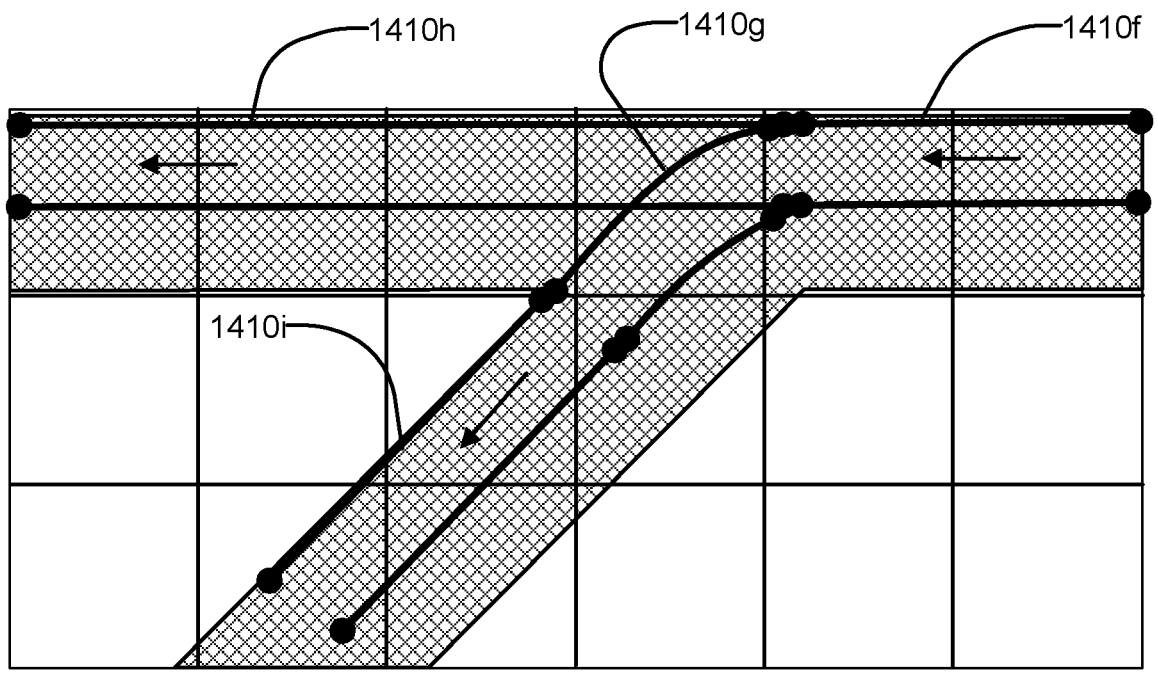

FIGS. 14A-B illustrates lane elements and relations between lane elements in an HD map, according to an embodiment. FIG. 14A shows an example of a T junction in a road illustrating a lane element 1410a that is connected to lane element 1410c via a turn lane 1410b and is connected to lane 1410e via a turn lane 1410d. FIG. 14B shows an example of a Y junction in a road showing label 1410f connected to lane 1410h directly and connected to lane 1410i via lane 1410g. The HD map system 110 determines a route from a source location to a destination location as a sequence of connected lane elements that can be traversed to reach from the source location to the destination location.

What is claimed is:

1. A method for synchronizing a light detection and ranging sensor (lidar) and a camera on an autonomous vehicle, comprising:
    transmitting, via the lidar, a plurality of light columns at a lidar frequency within a field of view (FOV) of the camera;
    for each start time of a plurality of start times:
        capturing, via the camera, a plurality of images at a camera frequency, each image captured over an exposure time,
        for each image of the plurality of images, identifying a number of light columns in the image, and
        calculating an alignment score based on the identified number of light columns in each of the plurality of images;
    selecting a start time with the highest alignment score;
    synchronizing the lidar and the camera according to the selected start time; and
    navigating the autonomous vehicle with lidar data detected by the synchronized lidar and image data captured by the synchronized camera.

2. The method of claim 1, wherein the plurality of light columns comprises at least three light columns within the FOV of the camera.

3. The method of claim 1, wherein the lidar emits the light columns in an infrared spectrum, and wherein the camera detects light in at least the infrared spectrum.

4. The method of claim 1, wherein for each start time, for each image, identifying the number of light columns in the image, further comprises:
    transforming each pixel in the image into an intensity value;
    calculating a gradient strength for each pixel based on intensity values of neighboring pixels; and
    identifying one or more pixels above a threshold gradient strength;
    wherein the number of light columns in the image is according to the identified one or more pixels.

5. The method of claim 1, wherein the lidar emits the light columns towards a reflective surface within a threshold distance from the lidar and the camera.

6. The method of claim 5, wherein the reflective surface is sufficiently wide to be incident with a threshold number of light columns.

7. The method of claim 1, wherein the plurality of start times is determined based on the exposure time for the camera and the camera frequency.

8. The method of claim 7, wherein a number of start times for the plurality of start times is based on a ratio of the exposure time for the camera to the camera frequency.

9. The method of claim 7, wherein a first start time and a second start time of the plurality of start times are within the exposure time for the camera.

10. The method of claim 1, wherein a number of images for the plurality of images is determined based on the camera frequency and the lidar frequency.

11. The method of claim 1, wherein for each start time, calculating the alignment score based on the determination in each of the plurality of images, further comprises:
    counting a sum of light columns determined to be present in the plurality of images;
    wherein the alignment score is based on the sum of light columns.

12. The method of claim 1, wherein synchronizing the lidar and the camera comprises adjusting one or more of: a lidar clock on the lidar and a camera clock on the camera.

13. A non-transitory computer-readable storage medium for synchronizing a light detection and ranging sensor (lidar) and a camera on an autonomous vehicle, the non-transitory computer-readable storage medium storing instructions that, when executed by a processor, cause the processor to perform operations comprising:
    transmitting, via the lidar, a plurality of light columns at a lidar frequency within a field of view (FOV) of the camera;
    for each start time of a plurality of start times:
        capturing, via the camera, a plurality of images at a camera frequency, each image captured over an exposure time, for each image of the plurality of images, identifying a number of light columns in the image, and calculating an alignment score based on the identified number of light columns in each of the plurality of images;

selecting a start time with the highest alignment score;

synchronizing the lidar and the camera according to the selected start time; and navigating the autonomous vehicle with lidar data detected by the synchronized lidar and image data captured by the synchronized camera.

14. The non-transitory computer-readable storage medium of claim 13, wherein the plurality of light columns comprises at least three light columns within the FOV of the camera.

15. The non-transitory computer-readable storage medium of claim 13, wherein the lidar emits the light columns in an infrared spectrum, and wherein the camera detects light in at least the infrared spectrum.

16. The non-transitory computer-readable storage medium of claim 13, wherein for each start time, for each image, identifying the number of light columns in the image, further comprises:

transforming each pixel in the image into an intensity value;

calculating a gradient strength for each pixel based on intensity values of neighboring pixels; and identifying one or more pixels above a threshold gradient strength;

wherein the number of light columns in the image is according to the identified one or more pixels.

17. The non-transitory computer-readable storage medium of claim 13, wherein the lidar emits the light columns towards a reflective surface within a threshold distance from the lidar and the camera.

18. The non-transitory computer-readable storage medium of claim 17, wherein the reflective surface is sufficiently wide to be incident with a threshold number of light columns.

19. The non-transitory computer-readable storage medium of claim 13, wherein the plurality of start times is determined based on the exposure time for the camera and the camera frequency.

20. The non-transitory computer-readable storage medium of claim 19, wherein a number of start times for the plurality of start times is based on a ratio of the exposure time for the camera to the camera frequency.

21. The non-transitory computer-readable storage medium of claim 19, wherein a first start time and a second start time of the plurality of start times are within the exposure time for the camera.

22. The non-transitory computer-readable storage medium of claim 13, wherein a number of images for the plurality of images is determined based on the camera frequency and the lidar frequency.

23. The non-transitory computer-readable storage medium of claim 13, wherein for each start time, calculating the alignment score based on the determination in each of the plurality of images, further comprises:

counting a sum of light columns determined to be present in the plurality of images;

wherein the alignment score is based on the sum of light columns.

24. The non-transitory computer-readable storage medium of claim 13, wherein synchronizing the lidar and the camera comprises adjusting one or more of: a lidar clock on the lidar and a camera clock on the camera.

25. A system comprising:

a lidar on an autonomous vehicle;

a camera on the autonomous vehicle;

a processor; and a non-transitory computer-readable storage medium for synchronizing a light detection and ranging sensor (lidar) and a camera on an autonomous vehicle, the non-transitory computer-readable storage medium storing instructions that, when executed by the processor, cause the processor to perform operations comprising:

transmitting, via the lidar, a plurality of light columns at a lidar frequency within a field of view (FOV) of the camera;

for each start time of a plurality of start times:

capturing, via the camera, a plurality of images at a camera frequency, each image captured over an exposure time, for each image of the plurality of images, identifying a number of light columns in the image, and calculating an alignment score based on the identified number of light columns in each of the plurality of images;

selecting a start time with the highest alignment score;

synchronizing the lidar and the camera according to the selected start time; and navigating the autonomous vehicle with lidar data detected by the synchronized lidar and image data captured by the synchronized camera.

26. The system of claim 25, wherein the plurality of light columns comprises at least three light columns within the FOV of the camera.

27. The system of claim 25, wherein the lidar emits the light columns in an infrared spectrum, and wherein the camera detects light in at least the infrared spectrum.

28. The system of claim 25, wherein for each start time, for each image, identifying the number of light columns in the image, further comprises:

transforming each pixel in the image into an intensity value;

calculating a gradient strength for each pixel based on intensity values of neighboring pixels; and identifying one or more pixels above a threshold gradient strength;

wherein the number of light columns in the image is according to the identified one or more pixels.

29. The system of claim 25, wherein for each start time, calculating the alignment score based on the determination in each of the plurality of images, further comprises:

counting a sum of light columns determined to be present in the plurality of images;

wherein the alignment score is based on the sum of light columns.

30. The system of claim 25, wherein synchronizing the lidar and the camera comprises adjusting one or more of: a lidar clock on the lidar and a camera clock on the camera.

* * * * *